United States Patent
Bermundo et al.

(10) Patent No.: US 12,360,713 B2
(45) Date of Patent: Jul. 15, 2025

(54) PRE-RENDERING AND STORING FOR PUSH PRINTING

(71) Applicant: KYOCERA Document Solutions Inc., Osaka (JP)

(72) Inventors: Neil-Paul Payoyo Bermundo, Glendora, CA (US); Mohamed Al Sayed Mostafa, Hawthorne, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/418,244

(22) Filed: Jan. 20, 2024

(65) Prior Publication Data

US 2024/0160392 A1 May 16, 2024

Related U.S. Application Data

(63) Continuation of application No. 17/746,715, filed on May 17, 2022, now Pat. No. 11,914,906.

(51) Int. Cl.
*G06F 3/12* (2006.01)

(52) U.S. Cl.
CPC .......... *G06F 3/1217* (2013.01); *G06F 3/1248* (2013.01); *G06F 3/1257* (2013.01); *G06F 3/126* (2013.01); *G06F 3/1267* (2013.01); *G06F 3/1273* (2013.01)

(58) Field of Classification Search
CPC ...... G06F 3/1217; G06F 3/1218; G06F 3/126; G06F 3/1257; G06F 3/1267; G06F 3/1273; G06F 12/0864; G06F 16/152
USPC .............. 358/1.15, 1.1, 1.13, 1.16
See application file for complete search history.

(56) References Cited

U.S. PATENT DOCUMENTS

| | | | | |
|---|---|---|---|---|
| 2003/0086098 A1* | 5/2003 | Sesek | ........... | G06F 3/1212 |
| | | | | 358/1.1 |
| 2005/0174599 A1* | 8/2005 | Ferlitsch | ........... | G06F 3/1285 |
| | | | | 358/1.15 |
| 2009/0094198 A1* | 4/2009 | Monga | ........... | G06F 3/1244 |
| 2011/0093468 A1* | 4/2011 | McAlvany | ........... | G06F 16/93 |
| | | | | 707/758 |
| 2017/0054859 A1* | 2/2017 | Zehler | ........... | G06F 3/1247 |
| 2018/0285036 A1* | 10/2018 | Bermundo | ........... | G06F 3/1273 |
| 2018/0300290 A1* | 10/2018 | Klein | ........... | G06F 40/103 |
| 2019/0034137 A1* | 1/2019 | Yokoyama | ........... | G06F 3/1211 |
| 2019/0250861 A1* | 8/2019 | Bermundo | ........... | G06K 15/1806 |

* cited by examiner

Primary Examiner — Jamares Q Washington
(74) Attorney, Agent, or Firm — W. Eric Webostad

(57) ABSTRACT

Apparatuses related to pre-rendering and storing prior to receiving a command to print for push printing is disclosed. In an example apparatus thereof, a memory is configured to store program code to provide a printing manager. At least one processor core is coupled to the memory, wherein the at least one processor core, in response to executing the program code, is configured to initiate operations for implementing the printing manager. The printing manager is configured to: receive a print job; pre-render the print job into a document image; store the document image; receive a push printing command; and download the document image to a printer engine responsive to the push printing command.

19 Claims, 20 Drawing Sheets

```
                ┌ %-12345X@PJL JOB NAME="job name"
                │ @PJL SET TIMEOUT=300
                │ @PJL SET RESOLUTION=600
                │ @PJL SET BITSPERPIXEL=1
         407 ┤  │ @PJL COMMENT="INFO:NUP 1; DUPLEX OFF; QTY 1; COLORMODE COLOR;"
                │ @PJL COMMENT="APP:C:\Program Files\Microsoft Office\OFFICE11\WINWORD.EXE;"
                │ @PJL SET ECONOMODE=OFF
                │ @PJL SET USERNAME="username"
                └ @PJL SET JOBNAME="job name"
   402 ──────── @PJL SET PRCS_Identifier=535052434A4F42         ┐
   403 ──────── @PJL SET PRCS_Mode=ON                            │
   404 ──────── @PJL SET PRCS_JobID={2c493103-1131-429c-9e84-fc236178afaa}  ├ 401
   405 ──────── @PJL SET PRCS_CacheAction=ON                     │
   406 ──────── @PJL SET PRCS_JobPathQRCode=[binarydata]         ┘
                ┌ @PJL SET QTY=1
                │ @PJL SET KPAGESPERSHEET=1
                │ @PJL ENTER LANGUAGE=PCLXL
                │ . . .
         407 ┤  │ [ BINARY PCLXL DATA
                │ . . .
                │ %-12345X
                │ @PJL EOJ NAME="job name"
                └ %-12345X
```

FIG. 4-1

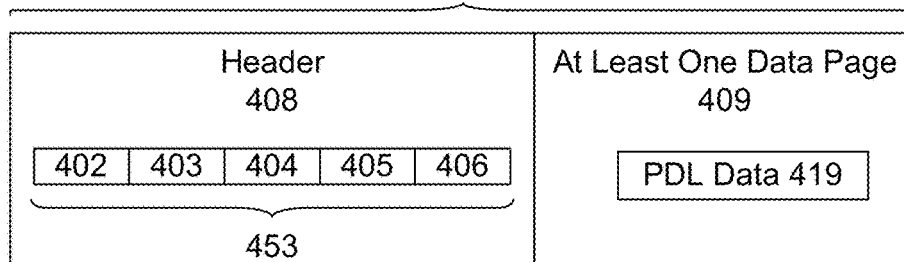

FIG. 4-2

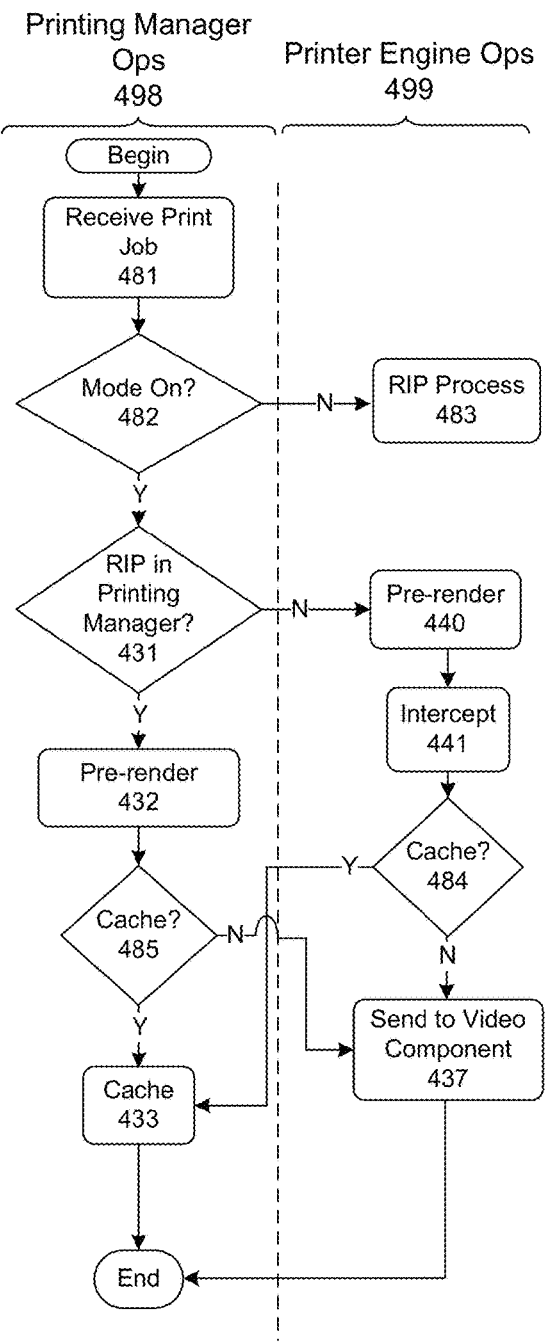
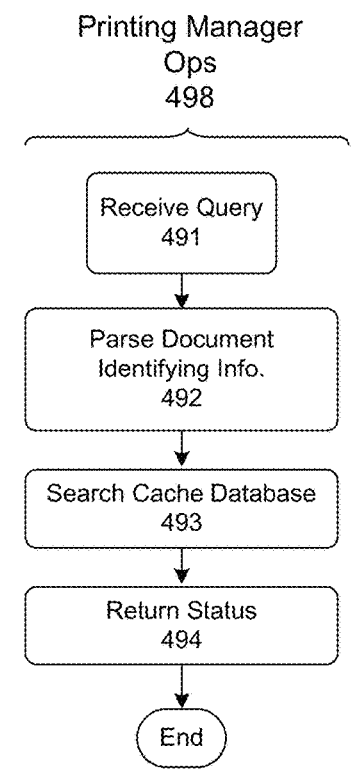
FIG. 5-5
FIG. 5-4

PRE-RENDERING AND STORING FOR PUSH PRINTING

CROSS-REFERENCE TO RELATED APPLICATIONS

The present application is a continuation of U.S. patent application Ser. No. 17/746,715, filed May 17, 2022, the disclosure of which is incorporated herein by reference in its entirety for all purposes consistent herewith.

FIELD

The following description relates to preparation for printing. More particularly, the following description relates to a pre-rendering and storing for push printing.

BACKGROUND

Conventionally, processing a document for printing occurs in multiple phases. These phases are generally referred to as an edit phase, a transmission phase, and a printer phase.

An edit phase may include two sub-phases, namely a user-document phase and a printer driver phase. A user document phase may involve process a document with a document editing application. A printer driver phase may involve converting a document to a print job by a printer driver. A transmission phase generally involves transmission of a print job from a source or host device to a destination for or to a destination printer, such as for example a network transmission of a print job to a destination printer.

SUMMARY

In accordance with one or more below described examples, a method related to pre-processing a print job is described. In an example method thereof, it is determined whether a document file is loaded in an application for the print job. Identifying information for the document file is retrieved. A data set obtained from the identifying information is sent to a print manager. A print history for the document file is updated responsive to the data set. The print job includes: pre-rendering of the document file into a document image; and caching of the document image. Print settings of the print job are associated with the document file. The print settings are tracked to provide criteria data to identify frequency of use of the document file.

In accordance with one or more below described examples, another method related to pre-processing a print job is described. In an example method thereof, a document file is loaded into an editing application. The loading of the document file is detected. Identifying information, including a job identifier, for the document file is gathered. A print manager is queried for the job identifier for the document file. Responsive to the job identifier indicating a document image for a pre-rendered version of the document file being stored in cache, the pre-rendered version is retrieved. The pre-rendered version is printed bypassing an image processor to provide the pre-rendered version directly to a video component of a printer engine to impart the pre-rendered version onto a print medium.

In accordance with one or more below described examples, yet another method related to pre-processing a print job is described. In an example method thereof, a print job with raw paged description language data is received. The print job has a mode flag for pre-rendering and caching. A check for status of the mode flag is performed. Responsive to assertion of the mode flag, first image processing of the page description language data is performed for the pre-rendering to provide a pre-rendered image for storing for the caching. Responsive to non-assertion of the mode flag, second image processing the page description language data is performed for the pre-rendering to provide the pre-rendered image.

In accordance with one or more below described examples, an apparatus related to identifying print jobs for pre-processing is described. In an example apparatus thereof, a header is for pre-rendering a print job stored in a memory of a host device. A data page is for at least one page of the print job stored in the memory of the host device. The header includes job parameters for the pre-rendering. The job parameters include: a system identifier to identify the print job for the pre-rendering; a mode select to set for the pre-rendering; a job identifier to identify the print job from other print jobs by a printer engine or a print manager; and a cache select to set for caching a pre-rendered image for the print job after the pre-rendering thereof.

In accordance with one or more below described examples, an apparatus related to pre-rendering and storing for push printing is described. In an example apparatus thereof, a memory is configured to store program code to provide a printing manager. At least one processor core is coupled to the memory, wherein the at least one processor core, in response to executing the program code, is configured to initiate operations for implementing the printing manager. The printing manager is configured to: receive a print job; pre-render the print job into a document image; store the document image; receive a push printing command; and download the document image to a printer engine responsive to the push printing command.

In accordance with one or more below described examples, another apparatus related to pre-rendering and storing for push printing is described. In an example apparatus thereof, a memory is configured to store program code to provide a printer engine of a printing device. At least one processor core is coupled to the memory, wherein the at least one processor core, in response to executing the program code, is configured to initiate operations for implementing the printer engine. The printer engine is configured to: receive a print job marked with a pre-rendering flag; pre-render the print job into a document image with the printer engine responsive to a job parameter included with the print job; and send the document image to a printing manager for storage thereof for subsequent push printing or the like.

In accordance with one or more below described examples, a system relating generally to pre-rendering prior receiving a command to print is disclosed. In such a system, system services are hosted in a server. An app is configured for communication with a printer driver of a computing device. A print manager is configured for networked communication with the server and the computing device. The print manager is configured for pre-rendering and caching of at least one document. A print medium handling device having a printer engine is configured for communication with the print manager and configured with an image processor and a graphics rendering component.

In accordance with one or more below described examples, a system relating generally to pre-rendering prior to receiving a command to print is disclosed. In such a system, a plug-in is hosted in a computing device. A system service operative by the computing device is configured for receiving commands from the plug-in. The system service is configured to issue an instruction responsive to a command from the plug-in to at least one of a printing manager of a server or a printer engine of a printing device. The printer engine is configured to pre-render a document image to provide a pre-rendered document image responsive to the instruction.

In accordance with one or more below described examples, another system relating generally to pre-rendering prior to receiving a command to print is disclosed. In such a system, a plug-in is hosted in a computing device including an image processor. A system service operative by the computing device is configured for receiving commands from the plug-in. The image processor is configured to pre-render a document image responsive to a command of the commands.

In accordance with one or more below described examples, a system relating generally to pre-rendering prior to receiving a command to print is disclosed. In an apparatus therefor, a print engine is in communication with and hosts the pre-rendering system. The pre-rendering system is configured to receive a print job in a page description language. An image processor is configured to pre-render the print job to provide a pre-rendered document image.

In accordance with one or more below described examples, another system relating generally to pre-rendering prior to receiving a command to print is disclosed. In an apparatus therefor, a pre-rendering system is in a non-printer host device and configured to process a print job in a page description language. An image processor integrated in the host device is configured to pre-render the print job to provide a pre-rendered document image. Memory of the host device is configured to receive the pre-rendered document image.

In accordance with one or more below described examples, a method relating generally to pre-rendering prior receiving a command to print is disclosed. In such a method, a determination is made that a document is open. An idle time is identified to pre-render at least a portion of the document prior to assertion of a print command therefor. At least the portion of the document is pre-rendered during the idle time thereof.

In accordance with one or more below described examples, another method relating generally to pre-rendering prior receiving a command to print is disclosed. In such a method, a determination is made that a document is offline. The document is determined to be a candidate to be pre-rendered. The document is pre-rendered to provide a rendered version thereof prior to assertion of a print command. The rendered version is cached.

In accordance with one or more below described examples, a system relating generally to pre-rendering prior receiving a command to print is disclosed. A memory is configured to store program code. A processor is coupled to the memory. The processor, in response to executing the program code, is configured to initiate operations for implementing pre-printing operations, including: determining a document is open; identifying an idle time to pre-render at least a portion of the document prior to assertion of a print command therefor; and pre-rendering at least the portion of the document during the idle time thereof.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 2-1 through 2-5 are respective block diagrams depicting examples of corresponding pre-rendering and caching systems.

FIG. 3-1 is a flow diagram depicting another example of a monitor flow.

FIG. 3-2 is a block-flow diagram depicting an example of a printing manager system for performing printing manager operations.

FIG. 3-3 is a block-flow diagram depicting an example of a printing system for performing printing operations.

FIG. 4-1 is a code listing diagram depicting an example of a page description language ("PDL") listing augmented with print job parameters.

FIG. 4-2 is a block diagram depicting an example of a print job.

FIG. 5-1 is a flow diagram depicting an example of a tracking flow for a printing manager to maintain a print history analysis.

FIG. 5-2 is a flow diagram depicting an example of an active document pre-rendering flow.

FIG. 5-3 is a flow diagram depicting an example of an offline document pre-rendering flow.

FIG. 5-4 is a flow diagram depicting an example of a print job handling flow.

FIG. 5-5 is a flow diagram depicting an example of a cache checking flow.

FIG. 5-6 is a flow diagram depicting an example of a caching flow.

FIG. 5-7 is a flow diagram depicting an example of a cache retrieval flow.

FIG. 6-1 is a block diagram depicting an example of a portable communication device ("mobile device").

FIG. 6-2 is a pictorial diagram depicting an example of a network.

FIG. 6-3 is a block diagram depicting an example of a printing device.

FIG. 7 is a block diagram depicting an example of a computing/printing device system.

DETAILED DESCRIPTION

Figure 1:
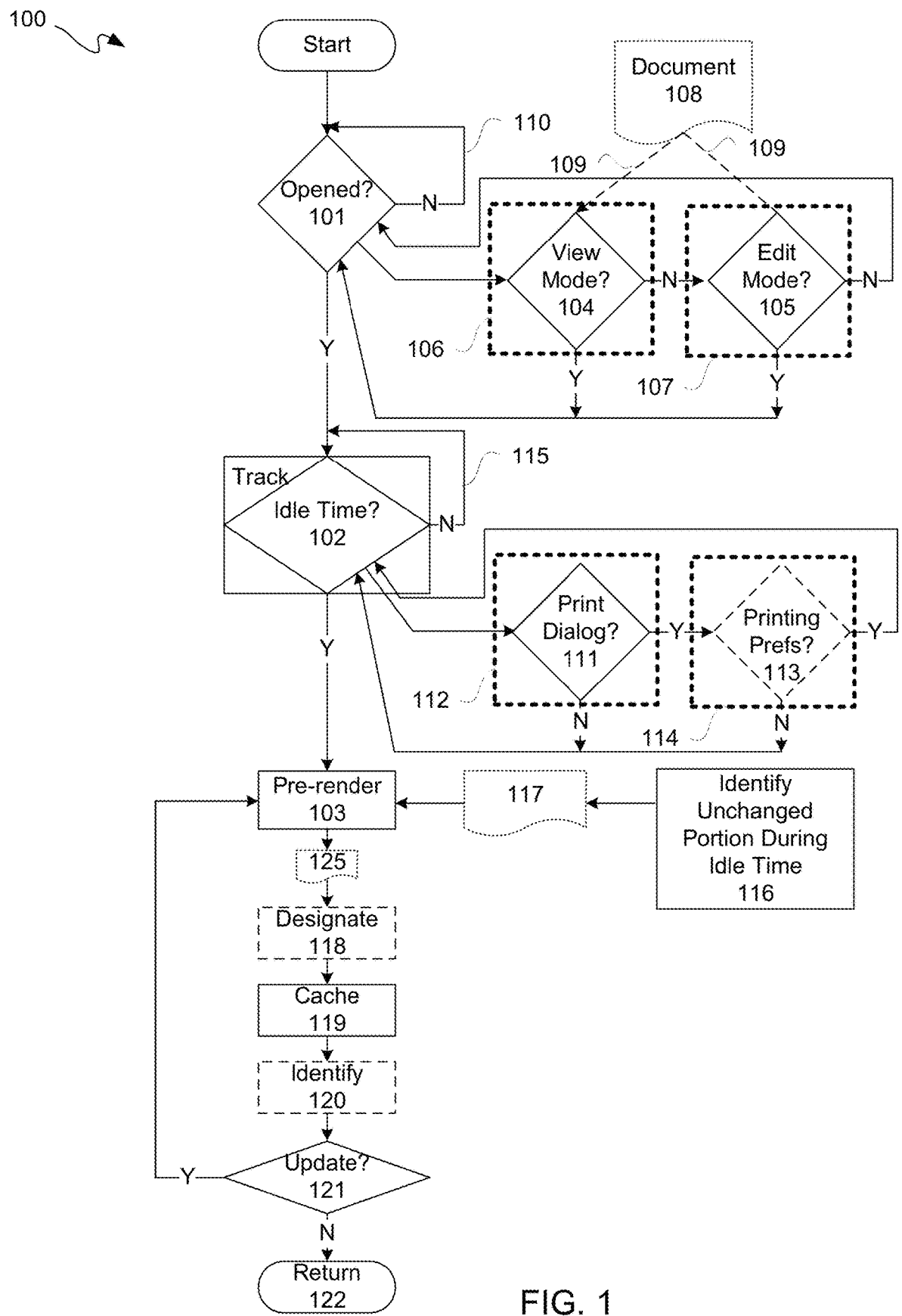
FIG. 1 is a flow diagram depicting an example of a monitor flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously described, a printer driver, which may be a device driver in Windows or other operating system, may be used to translate a document into a page description language ("PDL") print job. PDL data may be in any one of a variety of internal formats, such as XPS, PCL5, PCL6, PDF, or PostScript, among others.

Such a print job may be transmitted to a destination printer. However, in another example, a transmission phase may include intervening phases or sub-phases for "on-demand" or "pull" printing. For example, a print job may be transmitted to a print server or storage at or accessible by a print server, where such print job may be retrieved and downloaded from such print server or print server associated storage and then transmitted to a destination printer.

For a printer phase, a print job may be received at a job scheduler of an imaging device of a printer. Such a print job may be scheduled by such scheduler for processing by such an imaging device. Such a scheduled print job may then be passed to an image processor, such as for example a raster image processor ("RIP") of a printer, for PDL interpretation of such print job by one or more PDL interpreters of such an RIP for example.

A graphics renderer or graphics rendering service ("GRS"), which may be a component of an RIP for example, translates a print job's PDL description, commands and/or data, into graphics orders. Such graphics orders are generally an order list understandable by a graphics execution unit ("GEU") of a print engine. For example, a GRS, which for example may be an internal component in RIP firmware, may generate for example a binary data representation of PDL commands or data. Graphics orders are low-level graphics instructions understandable by a GEU.

A GEU and a print engine chip, which may be implemented for example as an Application Specific Integrated Circuit ("ASIC"), may generate a binary or rasterized representation, such as an image for example, of a print job or associated document from such graphics orders. For example, GRS generated binary or raster data may be understood and converted by GEU hardware to a drawing or pixels which may be drawn or rendered on paper. Conventionally, a GEU is implemented in hardware; however, for new or newer features and/or capabilities not yet ported to hardware, a software or firmware implementation of a GEU may be used.

Such a rasterized image may be scheduled for and subsequently passed down to lower-level print engine components, such as a halftone engine, a video engine, a raster processing unit ("RPU"), a finishing unit, print engine chip, and/or other components. Conventionally, an RPU is a firmware component of a print engine or at a print engine level. An RPU may be used for color conversion, stamp overlay, and/or other RPU associated operations.

Lastly, a print head of a print engine may render or draw a resulting rasterized image onto a print medium, such as paper for example. Though an example of a printer printing onto paper is used, the following description may likewise apply to other forms of imaging devices like printers. Along those lines, even though the following description is in terms of a multi-function printer ("MFP"), a standalone or dedicated printer, scanner, and/or copier, among other imaging devices may be used.

With the above general understanding borne in mind, various configurations for pre-rendering prior to assertion of a print command for printing systems and methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, CA-F or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Generally, processing time, T, for printing a document may be broken out into edit time, E, transmission time, X, and printer time, P. Edit time, E, which corresponds to an edit phase, may include time for making edits to a document and processing time of such document by a printer driver to provide a print job. Transmission time, X, may include time for transfer of a print job from a host device to a printer over a wired and/or wireless connection. Printer time, P, may be time for processing a print job at a printer. Processing time, T, can depend on print job complexity, with more complex print jobs taking more processing time than less complex print jobs. However, an accumulated processing time, T, where E+X+P==T, is consumed during printing phases.

When a print job does not go directly from a host device to a destination printer, but rather is sent or uploaded to a print server, such a print job may stay a print server for a wait period of time in addition to a transmission time from a host device to such print server and another transmission time from such print server to a printer. A print job may be stored at a print server as a data file for temporary or permanent storage. Storing a print job at a print server is a type of caching, which may be used in "pull" or "on-demand" printing.

Whether direct, pull, or on-demand printing is used, the amount of processing time T may be a bottleneck, especially when multiple host devices are sending print jobs to a printer. Moreover, for a same document printed multiple times for multiple copies, processing time, T, may be multiplied by the number of times such document is reprinted. This user wait time between selecting OK to print and obtaining a printout can negatively impact user experience. However, as described below in additional detail, this wait time or delay may be reduced or avoided.

Subsequent printing of a same document may take advantage of data from an initial printing, such as reuse of data processed during interpretation, graphics orders generation, and rendering phases. Additionally, there are instances providing opportunities for reducing user wait time.

FIG. 1 is a flow diagram depicting an example of a monitor flow 100. At operation 101, a monitor application ("app") determines a user has opened a document. Such a monitor app may be a standalone application or an application embedded in a host application, such as a document reading or editing application, in a host device.

At operation 102, an idle time to pre-render at least a portion of such document may be determined by such monitor app. At operation 102, one or more detected idle times may be tracked when viewing or editing documents or offline document files. At operation 103, a pre-rendering of at least such portion identified of such document may be performed during such determined idle time.

Operations 101 through 103 are pre-printing operations. Moreover, operations 101 through 103 are executed prior to assertion of a print command by a user. Along those lines, operations 101 through 103 may be used to speed up printing operations.

Figures 1, 2:
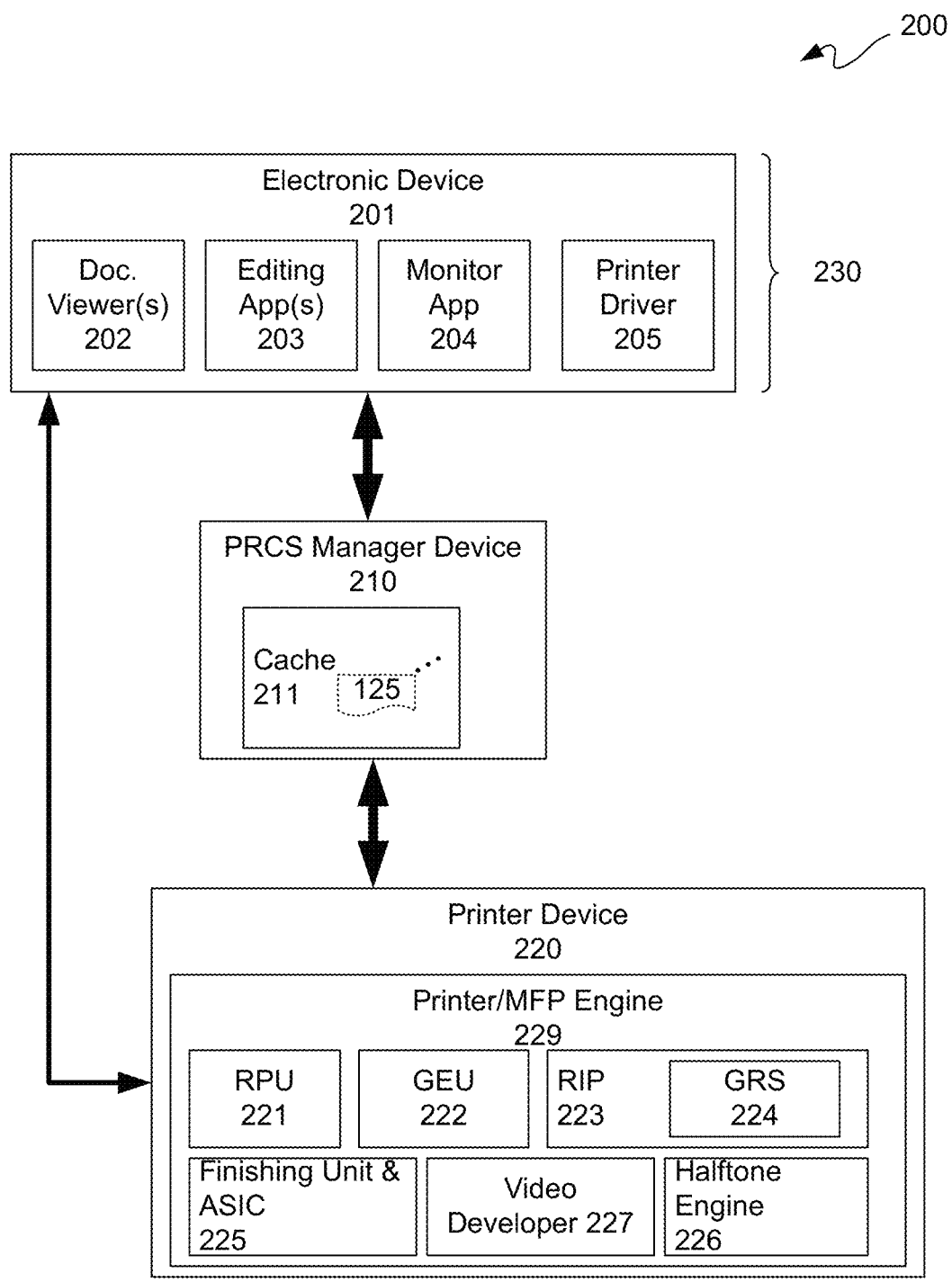
Figure 2:
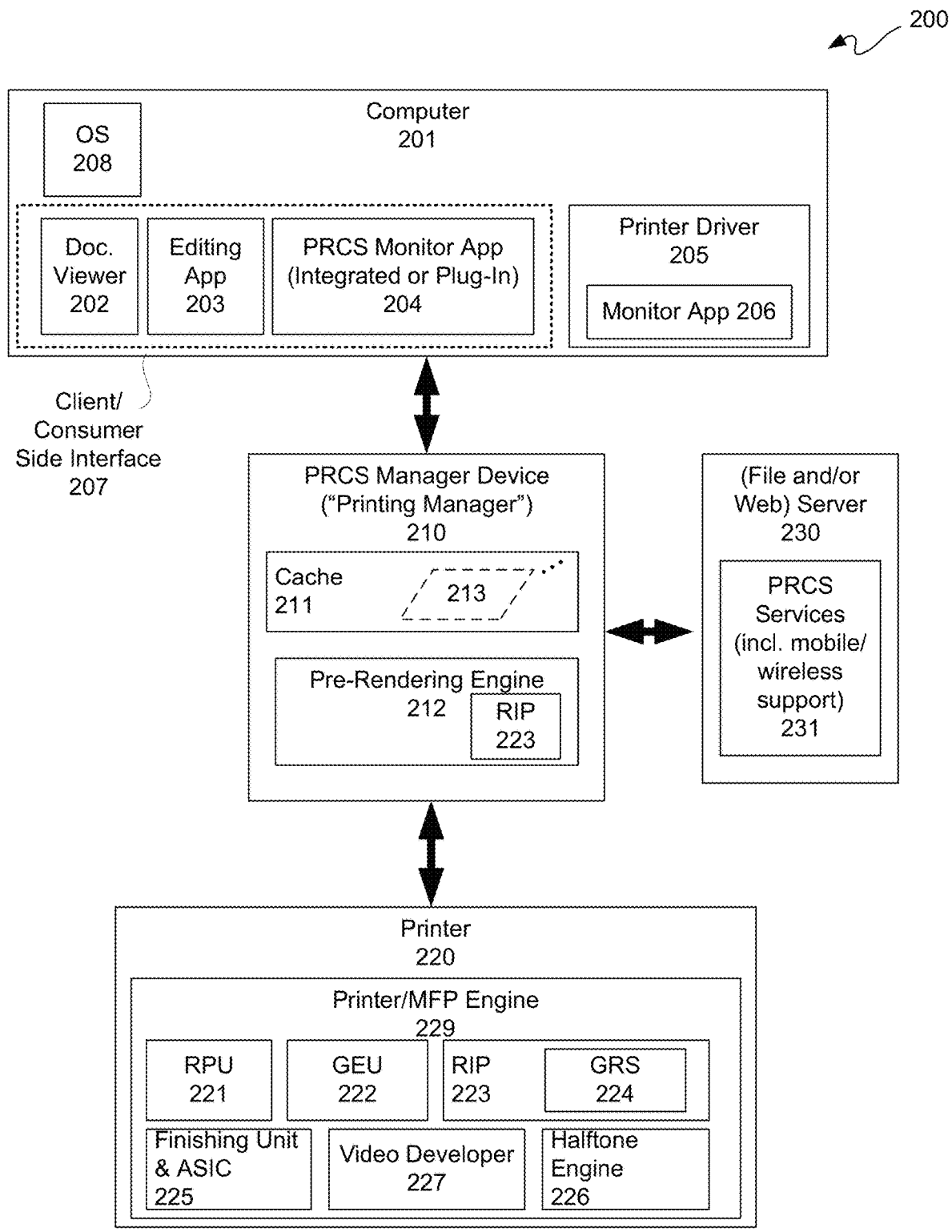

FIG. 2-1 is a block diagram depicting an example of a pre-rendering and caching system ("PRCS") 200. In this example, PRCS 200 includes an electronic device 201, a PRCS manager device 210, and a printer device 220.

Printer device 220 may be a dedicated printer, a multi-function printer ("MFP"), or another printer device. For purposes of clarity by way of example and not limitation, it shall be assumed that printer device 220 is an MFP 220. MFP 220 may include a printer/MFP engine ("printer engine") 229. Printer engine 229 may include an RPU 221, a GEU 222, an RIP 223 having a GRS 224, a finishing unit and MFP ASIC 225, and a halftone engine 226, among other known MFP 220 components.

Electronic device 201 may be a smart phone, a notebook/laptop computer, tablet, desktop computer, or like electronic device. For purposes of clarity by way of example and not limitation, it shall be assumed that electronic device 201 is a computer 201. Computer 201 may include a document viewer 202, an editing app 203, a monitor app 204, and a printer driver 205. Even though a document viewer 202 and an editing app 203 are illustratively depicted, other types of apps used for viewing and/or editing documents may be used. Examples of other types of apps include a web browser, a file management app, and/or a file explorer app.

PRCS manager device 210 may be a print server, a file server, a web server, or like device having cache storage 211 among other accessible storage. For purposes of clarity by way of example and not limitation, it shall be assumed that PRCS manager device 210 is a server 210.

PRCS 200 may be used to provide a faster workflow including use of analysis of user printing behavior and history. Using such data, pre-rendering and caching of documents or portions thereof (hereinafter collectively and singly "documents") may be used for a faster workflow by reducing delay or wait time.

While pre-rendering and caching may be used to reduce wait time, other operations may likewise benefit. For example, one or more printer driver operations, network transfer process, print job scheduling and configuration, one or more RIP operations, or other printer firmware and engine operations may be performed in advance during one or more idle times in background in order to reduce wait time after a print command is asserted to print a document.

Remaining delay after assertion of a print command may include time for notifying a printer engine that a document is ready for printing. If a pre-rendered document image 125 has not yet been downloaded from cache 211 to printer engine 229, additional time may be for on transmission or downloading of such pre-rendered and cached document image to printer engine 229. Further time may be for final processing at printer engine 229, such as for selection of any and all finishing options—stapling, punching-holes, binding, or folding, among others. Yet further additional time may be for actual printing, such as placement of toner or ink onto paper and ejecting of each printed page through rollers to one or more output trays. There may further be a transmission time of a print job from a print spooler at computer 201 or transmission time of a print job from a server 210 to MFP 220.

Aside from these wait times, by pre-rendering and caching other wait times can be substantially are reduced or eliminated. This may reduce time lag from the time a user clicks to print and when all pages are printed on paper or other print medium at MFP 220. This reduction in wait time may provide a user a better printing experience.

With simultaneous reference to FIGS. 1 and 2-1, monitor flow 100 and PRCS 200 are further described.

A monitor app 204 may be used to identify possible idle time opportunity instances. Possible idle time opportunity instances may include for example: a user creating or opening a document file; a user editing a document but not having made any change for a certain period of time; a user opening a Print Dialog, a user opening a Printing Preferences; and/or a user selecting "Ok" or other entry to start printing of a document. Printing Preferences is a well-known user interface for a printer driver 205. Printing Preferences' settings can either be control panel default print settings for a document being printed, or session-specific print settings when Printing Preferences is modified from a calling document-editing application, such as editing app 203 for example. A control panel is a management interface for print queues or printer drivers 205 in computer systems.

Other possible idle time opportunity events or instances to pre-process, including without limitation pre-render, a document may include: a document file observed to be frequently printed with no changes in page contents; a document file directly transferred or sent to a print queue or print driver in Windows OS or other operating system platform; a document file transferred to a printer such as via FTP, LPR, USB, WiFi, e-mail, AirPrint, Bluetooth, or other transfer protocol.

For example, sometimes documents are not loaded into a document editing app 203 but rather are transmitted directly to printers, and so such documents are candidates for pre-rendering and caching. Sometimes documents may be opened and changed, and then subsequently re-printed repeatedly without additional change. Such re-printed documents may not need to be reprocessed through printer drivers 205; moreover, such re-printed documents may not need to be preprocessed through a RIP. Such documents can be more directly pre-rendered, cached in cache 211 and then made ready for subsequent actual printing.

In one or more identified "idle times," which are opportunities for pre-rendering and then caching, a document may be pre-rendered in anticipation of a user's actual printing, and then such pre-rendered image may be cached in cache 211 in network storage or cloud storage accessible for subsequent printing. Document editing apps 203 may be used to create and edit documents that can be printed. These are applications used to create and edit documents that can be printed. For example, document editing apps 203 may include applications such as MS Office and other similar open-source or third-party office suites and the like. However, document editing apps 203 may further include browsers, such as Google Chrome, Microsoft Internet Explorer and Edge, and Mozilla Firefox, among others, that can view web pages, PDF, and other types of files and can print those loaded files to printers. When candidate document files are not modified, such as for example dragged or dropped to a print queue or a printer driver 205 for transmission and printing, there may be opportunities for performing one or more actions on such document files to provide more efficient printing workflows.

Along those lines, a monitor app 204, which may be embedded in a document editing app 203 or a separate application in communication therewith, may determine when document is open in a view mode or an edit mode at operation 101. If a view mode is open as determined at operation 104, then an idle time check may be performed at operation 102. If an edit mode is open as determined at operation 105, then an idle time check may be performed at operation 102.

In this example, a view mode 106 is of one or more document viewer applications ("document viewer 202"), and an edit mode 107 is of a document editing app ("editing app") 203. In this example, document viewer 202 and editing app 203 are each separate from a monitor app 204, which executes monitor flow 100. However, in another example, a monitor app 204 may be embedded in whole or in part in a document viewer 202 and/or editing app 203 as an integrated or plug-in app.

In this example, a document 108 is a file loaded, as generally indicated by dashed lines 109, into a document viewer 202 or editing app 203. If a document viewer 202 is opened in a view mode as determined at operation 104, then for operation 101 an indication of same is asserted for a subsequent an idle time check to be performed at operation 102.

If, however, a document viewer 202 is not opened or not in a view mode 106, then a check for an open editing mode 107 of an editing app 203 may be performed at operation 105. If an editing app 203 is open in an edit mode 107 as determined at operation 105, then for operation 101 an indication of same is asserted for a subsequent an idle time check to be performed at operation 102; otherwise, a check for an opened document viewer 202 or editing app 203 may be repeated at operation 101, as generally indicated by a loopback operation arrow 110. This loopback operation 110 may time out or may close with closing of a document viewer 202 or editing app 203, as applicable.

At operation 102, an idle time may be identified after a period of time during which at least a portion of document 108 is unchanged, such as when being viewed in document viewer 202 or being present in editing app 203. In this example, an idle time may be identified responsive to opening of a print dialog 112 as determined at a check for same at operation 111. If an opportunity is identified responsive to opening of a print dialog 112, then optionally a check for an opening of a printing preferences 114 of such print dialog 112 may be performed at operation 113. In this example, print dialog 112 and print preferences 113 are of a printer driver 205.

If a print dialog 112 is not open as determined at operation 111 or a printing preferences 114 is not open as determined at operation 113, then a check for an idle time at operation 102 may loopback, as generally indicated by a loopback operation arrow 115. This loopback operation 115 may time out or may close with closing of a document viewer 202 or editing app 203, as applicable.

However, if at operation 111, or 113, an opportunity is identified responsive to selection of a start printing command of a print dialog 111, or printing preferences 113, then a pre-render operation 103 may be performed. In other words, a pre-rendering operation 103 may be performed prior to initiation of a print command.

Generally, the amount of time from the point a user starts from opening a document to selecting to print a document and then additional time for printing by a print engine to a print medium can be significant. To reduce the nuisance of waiting, pre-rendering may be performed during one or more idle times on a pre-rendering candidate document before a print command is asserted. An example of an idle time may be time during reviewing or editing of a document, when such document is not being actively modified and is just being viewed or reviewed by user. Another example of an idle time may be time when a document is just in a file system, stored and unmodified, and thus such a document may be a candidate for pre-rendering.

For a pre-render operation 103, an unchanged portion of document 108 may be identified determined an idle time at identifying operation 116. Such identified portion 117 may be provided for pre-rendering at operation 103. An identified portion 117 may be a single page, sequential and/or non-sequential pages, and/or sections or parts thereof of a document. Furthermore, an entire document 108 may be pre-rendered for at pre-rendering operation 103. Moreover, a portion may be a part of a page, which may be a band, a row, a geometrical area, or an object on such page. Output from pre-render operation 103 may be a pre-rendered document image 125.

A pre-rendered document image 125 may be a binary or rasterized representation of a document or portion thereof. For example, a pre-rendered document image 125 may result from processing a PDL print job through an RIP processor. A document or portion thereof may be processed through a PDL interpreter, then through a GRS and through a GEU.

After pre-rendering, optionally a designating operation 118 of at least portion 117 having been pre-rendered by pre-rendering thereof at operation 103 may be designated as one or more pre-rendered parts. At operation 119, such one or more pre-rendered parts designated or an entire pre-rendered document 117, as applicable, may be cached in cache 211.

Optionally, at identifying operation 120, which may follow directly after caching, at least a subset of one or more pre-rendered parts may be identified as having one or more changes following pre-rendering thereof. If any such changes are identified at operation 120, then a check for updating at operation 121 may cause such a re-pre-rendering for at least such subset of such one or more pre-rendered parts by re-rendering thereof at operation 103 including rendering such one or more changes. If no update is to be performed as determined at operation 121, monitor flow 100 may return at 122.

A document or portion thereof can be pre-rendered at operation 103 and cached in cache 211 at operation 119 due to presence of one or more opportunities allowing such document or portion thereof to be processed in background. Such processing may occur during one or more background or background-like idle times during use of an editing app 203 or re-use of un-edited and un-modified document during use of a document viewer 202. A document which may be processed in background or background-like idle may be a pre-rendering candidate document.

PRCS stores of pre-rendered document images may be stored in cache 211. Along those lines, cache 211 in another example may be shared network storage, cloud or designated file servers. Such cache 211 of pre-rendered document images may be used for on-demand printing. Data analytics may be used to determine which documents are candidates for pre-rendering for storing in cache 211 for subsequent printing or distribution. Along those lines, printing may be an electronic printing, such as printing to PDF. Candidates may include documents that are opened or viewed but whose print settings are not modified, namely kept at prior selections or default settings, and data analytics suggest that such documents are going to be printed.

As previously described, during a document creation, editing or viewing phase 230, PRCS 200 operates in the background in anticipation of a user printing a document during an idle time in a printing workflow. Pre-rendering can be performed during one or more of such idle times. During these times, a page is not being changed, and a computer or application is not busy modifying page content. Computer 201 may be configured to have a document pre-rendered for an unchanged or unaffected page in background before a user does an actual change to such page content. At some point, a user may finish editing a page and may be reviewing same.

Eventually, it may be likely a user will print such document; however, in another instance, a user may archive or save such document for printing later. In such scenarios, there is opportunity to pre-render a document during phase 230 so that when a user elects to print such document, such document has been pre-rendered and so print-out of same is just about ready to be produced at printer 220.

A document may be pre-rendered into a format that can be processed efficiently in printer engine 229 or an imaging device, where many printing phases, such as for example RIP processing, GRS processing and GEU processing, could be skipped. Then, such pre-rendered document image could be transmitted to printer 220 and processed efficiently and effectively for actual rendering onto paper or other print medium.

In addition to pre-rendering of documents, a caching service to cache 211 of one or more pre-rendered document images 125. In another example, a pre-rendered document image 125 could be cached in a local hard drive, network shared storage, cloud or Internet storage for re-use. One or more benefits of cached pre-rendered document images may be: re-use for re-printing from any device; shareable among different users or people for printing the same document; and/or efficient printing time due to skipped RIP processing, resulting in fast production of printouts.

PRCS 200 may be configured to track documents, such as via monitor app 204 at tracking operation 102 of FIG. 1. PRCS 200 may at least in part track documents that are frequently opened, edited or printed, where data analytics may be used to set thresholds for what is to be considered frequent. Monitor app 204 may further track at operation 102 print settings used. Tracked print-settings may be used to determine if one printing of a document is the same or different compared to a prior printing of the same document. Associated print-settings to a pre-rendering candidate document can be shown to a user so such user can validate and know what to expect to see on a printout to be produced.

There may be two types of pre-rendering of documents, namely pre-rendering of an open or active document or pre-rendering of an unopen or offline document.

As previously described, pre-rendering of an active document is for a document that is open in a view or an edit mode such as in a document viewer 202 or an editing app 203. Again, there are times when there are opportunities to pre-render a document that is loaded in a document viewer 202 or editing app 203 including web browsers, image viewers, an XPS viewer, or an Acrobat Reader, among others.

For a PRCS monitor app 204 as a plug-in, such as in an editing app 203, idle times other than those previously described may be identified. Along those lines, FIG. 2-2 is a block diagram depicting another example of a PRCS 200. As some of the details in FIGS. 2-1 and 2-2 are the same, generally only the differences are described below for purposes of clarity and not limitation.

In this example, computer 201 includes a document viewer 202, an editing app 203, and a PRCS monitor app 204 integrated in such apps 202 and 203 or a plug-in to such apps 202 and 203 as part of a client or consumer side interface 207. Additionally, computer 201 includes a printer driver 205 having a PRCS plug-in monitor app ("monitor app") 206. Monitor app 206 may be used for tracking printing operations, including print settings.

For monitor app 204 and/or 206 integrated as a plug-in a document editing app 203 and/or printer driver 205, respectively, for example, idle times in addition to those previously described may be discovered. An example of such an idle time is when a user has spent some time just viewing one or more pages and not actively making any changes on to content of an active document. During these times, monitor apps 204 and 206 as plug-ins may be in communication with one another to work cooperatively with editing app 203 and printer driver 205, respectively, to generate a print job 213, where such print job 213 may be sent in advance of printing for pre-rendering and caching. By in advance of printing it is generally meant in advance of assertion of a print command.

In this example, a PRCS printing manager or server 210 includes cache 211 for storing one or more print jobs 213 and a pre-rendering engine 212. In this example, in addition to storing a print job 213, server 210 may provide such print job 213 to pre-rendering engine 212 for performing a rendering operation thereon to generate a pre-rendered document image 125. Pre-rendered document image 125 may be stored in cache 211 prior to being sent to MFP 220.

In this example, server 210 controls and coordinates print job generation, such as between editing app 203, printer driver 205, and operating system 208 of computer 201. However, in this example, a separate server 230, which may be a file and/or web server, may be used to coordinate PRCS services 231 among mobile or wireless devices in communication with PRCS 200. Server 230 may be in communication with server 210 for downstream controls and coordination of print job generation for one or more mobile or wireless devices via PRCS services 231 of server 230.

A signal, such as in response to a user selecting a print command, may be provided from computer 201 to server 210 and MFP 220 to send or send a copy of a pre-rendered document image 125 from cache 211 to MFP 220 and to render an associated document using such a pre-rendered document image 125 to print to a print medium by MFP 220. In other example, such a computer 201 signal may be provided to MFP 220 to obtain a copy of a pre-rendered document image 125 from cache 211 to MFP 220 and to render by MFP 220 a document associated therewith using such a pre-rendered document image 125 to print to a print medium. For pre-rendering of active documents, pre-rendering of parts of pages or selected pages of a document may be performed, or pre-rendering of an entire document may be performed. If an entire document is pre-rendered, then a rendering operation by MFP 220 may be avoided, and such entire document may be directly printed to a print medium.

Through system services, application and printer driver plug-ins or interfaces in PRCS 200, document viewing and editing apps can interface with printer driver 205 to pre-render parts of pages, such as bands or rows or some geometrical area (rectangular, circular, and so on) and/or object basis (font, shape, vector or image). Pre-rendering may also be done on select pages (or page range) of a document. Such selected pages could include parts of pages or entire inactive pages that are not being actively used, edited or worked on by a user. Such parts of pages or entire pages can be designated as "pre-rendering parts" or "pre-rendering pages" going forward.

"Pre-rendering parts" may be sent for pre-rendering, and then saved in a cache 211. Pre-rendering parts may be updated when a user finishes editing a document. After pre-rendering parts are pre-rendered and cached, such pre-rendered parts can be designated as "pre-rendered parts" or "pre-rendered page images". Incremental updating of "pre-rendered parts" or "pre-rendered page images" may be performed through collaboration of document-editing apps, system services or printer driver plug-ins that integrate or implement PRCS 200 as described herein.

An entire document may be pre-rendered. Pre-rendering of an entire document may be applicable to a document that a user has opened in a document editing app but such user is not actively modifying or editing such document. With collaboration with PRCS monitor app 206 and printer driver 205, a loaded document can be processed in background of computer 201 to generate for example a PDL print job 213, which can be relayed and processed through PRCS components in advance and in background for pre-rendering by pre-rendering engine 212. Such a pre-rendered document may then be cached and can be re-used for future or eventual re-printing. If there are changes to print settings when re-printing a document that was previously pre-rendered and cached, if such print settings do not affect or modify page content, like if such print settings are only for the selection of finishing options, then it is still possible to re-use a previously pre-rendered document that is stored in cache 211.

There may be one or more other pre-rendering system configurations. Along those lines, other pre-rendering system configurations may include: an embedded PRCS in a printer engine, an external portable or mobile device with PRCS and RIP firmware, or PRCS services in a host device.

Figures 2, 3:
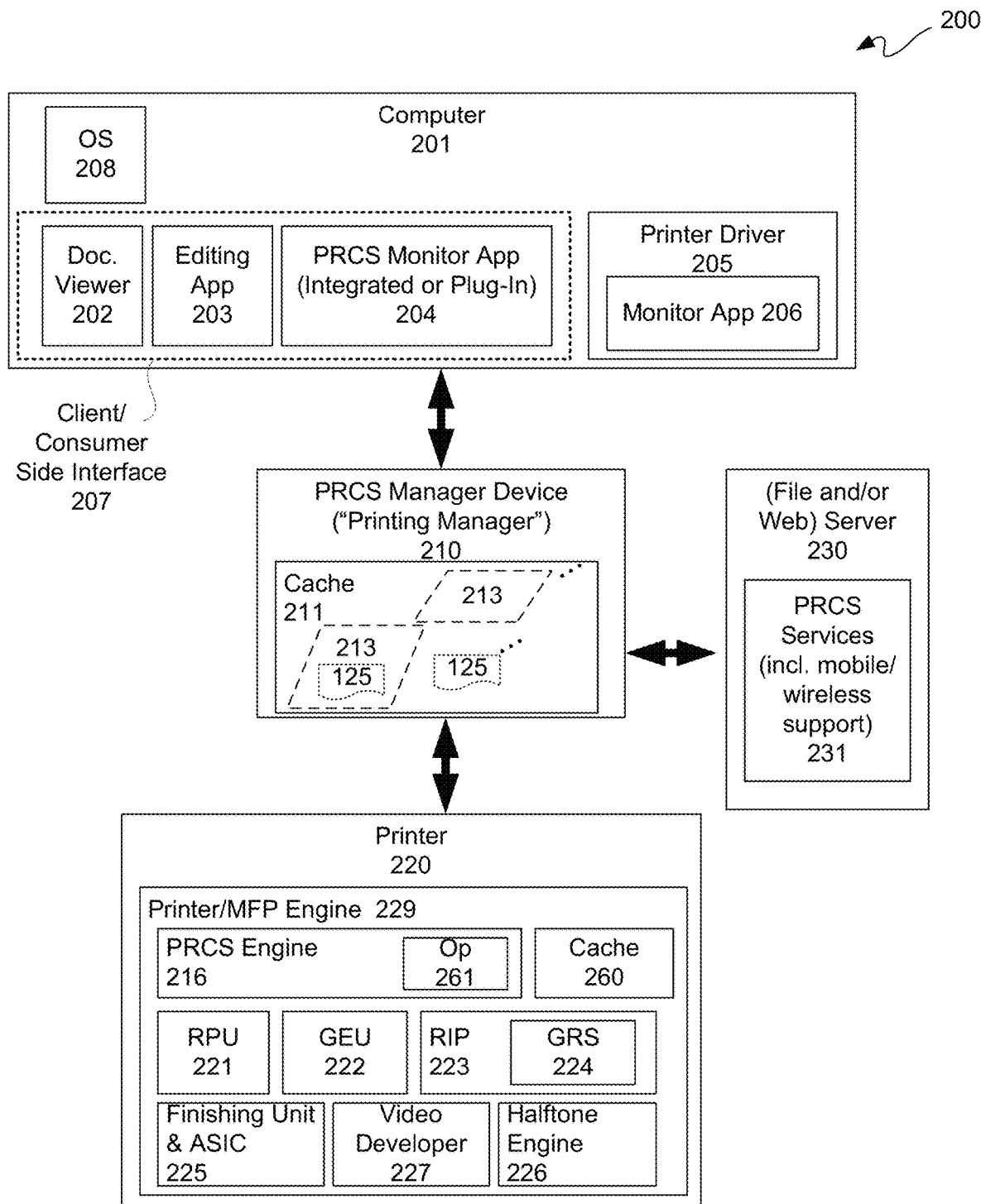

FIG. 2-3 is a block diagram depicting another example of a PRCS 200. As some of the details in FIGS. 2-1 through 2-3 are the same, generally only the differences are described below for purposes of clarity and not limitation.

FIG. 2-3 is the block diagram of FIG. 2-2 with an embedded PRCS engine 216 in MFP engine 221 but without pre-rendering engine 212 in PRCS manager device 210. PRCS engine 216 may be embedded in firmware memory of MFP engine 221 or otherwise hosted by MFP 220 for communication between PRCS engine 216 and MFP engine 221. PRCS engine 216, which may generally be referred to as printer engine 229 in some instances below, may include a caching operator 261 for communication with an optional cache 260 of printer engine 229.

In a configuration of PRCS engine 216 embedded in a printer engine, PRCS engine 216 receives PDL print jobs 213, such as via PRCS manager device 210 in communication with one or more clients, and works with RIP 223 to cause such RIP to pre-render such print jobs 213 to create corresponding pre-rendered document images 125. PRCS engine 216 need not instruct MFP engine 221 to eject paper, because after generation of a pre-rendered document image 125 for a print job 213, such PRCS engine 216 prepares, configures and sends such pre-rendered document image 125 for caching, such as in cache 211 of PRCS manager device 210 for example. PRCS engine 216 may be firmware configured to carry-out or cause to carry-out operations for configuring a print job 213 into a pre-rendered document image 125 for caching as previously described herein and not repeated for purposes of clarity.

Figures 2, 3, 4:
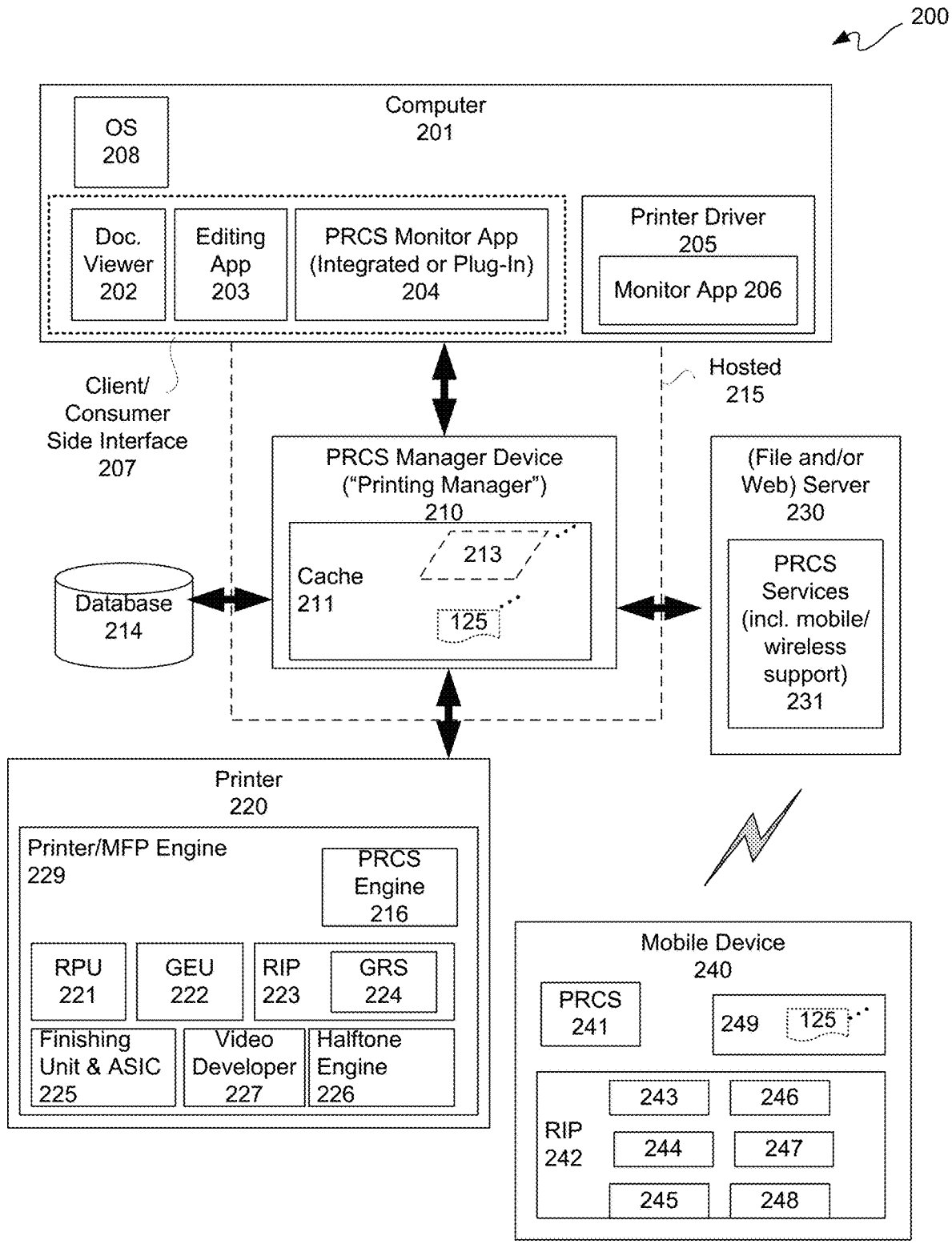

FIG. 2-4 is a block diagram depicting another example of a PRCS 200. As some of the details in FIGS. 2-1 through 2-4 are the same, generally only the differences are described below for purposes of clarity and not limitation.

FIG. 2-4 is the block diagram of FIG. 2-2 without pre-rendering engine 212 in PRCS manager device 210 but with a PRCS component 241 in a mobile device 240. PRCS component 241 may be embedded in firmware memory of or otherwise integrated in mobile device 240. Additionally, mobile device 240 may have embedded in firmware memory thereof an RIP 242. Cache and storage memory of mobile device 240 is generally depicted as memory 249 for purposes of clarity and not limitation, as different types and/or separate chips of memory may be used for one or more of these operations.

PRCS component 241 features may be integrated in mobile device 240 or other another external computing device, such as for example a server, a desktop computer, a minicomputer, a Raspberry Pi, or a Linux box, among others. However, for purposes of clarity by way of example and not limitation, a mobile device 240 is further described. Mobile device 240 can include RIP 242 firmware for pre-rendering of PDL print jobs 213.

PDL print jobs 213 can be parsed, processed and pre-rendered into a pre-rendered document image 125. In this example, pre-rendered document image 125 may be a compressed binary data representation of a document. By having mobile device pre-rendering operations outside of MFP engine 229, CPU, memory, and other resource intensive tasks may be offloaded from printer 220 and into one or more external portable or mobile devices, such as mobile device 240 which for example may be a smart phone, watch or another wearable, or tablet.

Such RIP 242 firmware internal to mobile device 240 may include known RIP components. Such known RIP 242 components may include: a print Job scheduler 243; a parser and interpreter 244, such as for PDLs such as XPS, PCL5, PCL6, PDF, Postscript, Kyocera PDL, or Kyocera PRESCRIBE, among others; and a graphics rendering component 245 such as for translating PDLs into GEU graphics orders.

RIP 242 may further include an SWGEU or HWGEU processor 246 for translating GEU graphics orders into a compressed binary data representation of a document, which is pre-generated document image 125. Again, the result of external or mobile device pre-rendering support may be a pre-rendered document image 125. This result may be a prepared, configured, and packaged pre-rendered document image 125 in memory 125 of mobile device 240, which may then be set for printing, which may include caching in cache 211.

FIG. 2-5 is a block diagram depicting another example of a PRCS 200. As some of the details in FIGS. 2-1 through 2-5 are the same, generally only the differences are described below for purposes of clarity and not limitation.

FIG. 2-5 is the block diagram of FIG. 2-4 with a PRCS services 251 instead of a PRCS component 241 in a host device 250, which may be a mobile device 240 or another external computing device as previously described herein.

PRCS services 251 may be an app in memory 249 of mobile device 240 in contrast to integration of a PRCS 241 in firmware of a mobile device 240 as in FIG. 2-4. Additionally, computer 201 may optionally include an image processor 209 configured for pre-rendering a document or portion thereof. In an example, image processor 209 may be in hardware of computer 201. In another example, image processor 209 may be an RIP resident in firmware of computer 201.

PRCS services 251 may be in communication with an RIP 242. PRCS services 251 may include a caching capability, which can be implemented at such a host device where document editing application(s) and printer driver(s) reside. This allows for local and immediate generation of a print job 213 in mobile device 250 and pre-rendering services to generate a pre-rendered document image 125 for such print job directly for caching storage in cache or memory 249. Moreover, such pre-rendered document image 125 cached in mobile device 250 may be directly sent to a printer 220 for printing or may be sent through server 230.

FIG. 3-1 is a flow diagram depicting another example of a monitor flow 100. Because monitor flows 100 of FIGS. 1 and 3 have some same components, same description therefor is generally not repeated for purposes of clarity and not limitation. Monitor flow 100 of FIG. 3-1 is further described with simultaneous reference to FIGS. 1 through 3.

After starting monitor flow 100, a check to determine if a document, such as document 108, is offline may be performed at operation 301. In other words, a check may be made to determine whether document is open or not at operation 301. In this example, if it is determined that a document 108 is open at operation 301, then processing for a view mode 106 or an editing mode 107 may be performed as previously described.

If, however, it is determined that a document 108 is offline at operation 301, then there is an idle time to pre-render such document 108 in its entirety. Along those lines, at operation 102, it will be determined that such an offline document is a candidate for pre-rendering, as there is an idle time for pre-rending of an offline document. Generally, all offline documents are candidates for pre-rendering. The actual full "printing" of a candidate document may be done only once. Subsequent re-printing can be through the re-use of the pre-rendered image of a document, where some pre-rendered image may be obtained from cache. A combination of benefits associated with such pre-rendering offline of documents may include: only having to print once; an ability to re-use or re-print pre-rendered offline through printer driver and through an external RIP firmware or in printer RIP firmware; and/or a cache of pre-rendered document images for re-use or re-printing. Along those lines, each next time a previously offline document is downloaded to a printer for printing, only a pre-rendered document image therefor may be processed in a printer engine. Printer firmware may be able to skip RIP processing, and a pre-rendered document image may be relayed directly to video component for rendering onto a print medium, such as paper. In this example, paper printout may come out very fast for pre-rendered document images.

For an offline document, one or more document files therefor may be tracked to determine if they are candidates for more direct printing. If offline document files are among frequently opened and printed documents, such offline document files may be processed and pre-rendered in advance, and generated pre-rendered document images for such document files may be cached for subsequent re-printing.

Determining candidacy of an offline document for prerendering and caching thereof may include at operation 102 tracking one or more files constituting such document. As an offline document is determined to have an idle time, after operation 102 optionally a determination at operation 302 may be made for determining frequency with which such one or more files are opened for printing of such document. Optionally, at operation 303 it may be determined whether such frequency, F, is greater than a threshold, Th. Such a threshold may be application dependent and may be generated with printing data analytics.

If such printing frequency does not exceed such a threshold, then such offline document may be pre-rendered in its entirety at operation 103. Responsive to a printing frequency for an offline document exceeding a threshold amount, at operation 304 such offline document, or more particularly such document files, may be flagged for pre-rendering and caching thereof for re-printing without raster image processing. In this manner, only documents which are frequently re-printed for example may be stored in cache, so cache storage is not taken up with documents that are less frequently, if at all, re-printed.

At operation 103, such offline document may be pre-rendered to provide a pre-rendered version thereof and may have associated therewith flagging added at operation 304. At operation 119, such pre-rendered version may be cached, along with flagging.

For an offline document rendered in its entirety, there should not be any changes identified at operation 120. However, optionally a check may be made at operation 120 to determine whether such a pre-rendered version includes flagging. If a pre-rendered version includes flagging as determined at operation 120, then such pre-rendered version may be directly processed through a printer engine 229 with a bypass route as set at operation 305 to speed-up print processing. Printing from printer engine 229 may be performed at operation 306 with such bypass.

Responsive to a download for a pre-rendered version cached to a printer for printing, such pre-rendered version may be processed through a printer engine 229 of MFP 220. This processing may include bypassing an image processor, such as an RIP 223, of print engine 229 responsive to settings made at operation 305. This bypassing allows such a pre-rendered version to be more directly provided to a video component. For example, with reference to FIGS. 2-1 and 2-2, a video component may be at a same level or in a same group as finishing unit and ASIC 225 and halftone engine 226, such as for example video developer 227. Video developer 227 may be used to "develop" or generate imaging data, such as for printing onto paper for print job. After such developing by video developer 227, further image processing may be avoided. Input data to video developer 227 may be data that can be fed and processed before any marking or graphics are rendered on paper. When such final data is received and processed, processing speed is enhanced because no further image processing need occur for such document. In this example, finishing unit and ASIC 225, video developer 227, and halftone engine 226 may be of printer engine 229 to impart a pre-rendered version more directly onto a print medium to speed up printing.

With continuing reference to FIGS. 1 through 3, by using background processing of document for pre-rendering, pre-rendering may be less or non-intrusive to user as user edits or views a document. Offline files may be pre-rendered in advance so that when they are sent to one or more printers for printing, such offline files may have been previously pre-rendered and cached. A cached pre-rendered image may be readily processed at a printer.

Documents being viewed in a document editing/viewing application, such as for example MS Word, Acrobat Reader or web browser, may be processed in background through a plug-in or a system service. A print job may be sent in advance to a printer with a PRCS firmware component or a printing manager server ("printing manager") 210 at a server or external portable device with RIP support for pre-rendering and caching.

Documents that are being actively edited or changed may be processed through a background or system service when parts of a document are unmodified. Subsequent pages or prior pages or certain parts of a page may be processed as those are not a current page being edited or changed.

Each other document or parts thereof that are being extensively modified may go through a conventional process. This conventional processing in combination with pre-rendering and caching as described herein facilitates a user having a better and more efficient printing experience.

With continuing reference to FIGS. 2-2 through 2-5, PRCS components may be positioned in a PRCS 200 having respective roles and relationships with each other. Along those lines, PRCS services 231 may perform tracking and relaying of candidate offline documents in one or more file or web servers 230 for pre-rendering in advance of printing and in background with caching to follow.

A PRCS printer driver plug-in, such as PRCS plug-in monitor app 206 for example, may interface with printer driver 205 to track print settings and documents that are printed through printer driver 205. Printer driver 205 may relay a PRCS print job 213 with raw PDL data to a printing manager or print manager 210 at a server or standalone device for pre-rendering in advance of printing and in background with caching to follow.

Monitor app 201, which may be hosted in computer 201 with printer driver 205, may be integrated into or a plug-in of a document viewer 202 or editing app 203 on a client/consumer side interface 207. Monitor app 201 may work with document editing app 203 to track "idle times" in a loaded document.

Monitor app 201 may interface with other PRCS components, including PRCS plug-in monitor app 206 of printer driver 205 to relay a PRCS print job to 213 to printing manager 210 for pre-rendering in advance and in background with caching to follow. MFP engine 229 at printer 220 may receive a PRCS print job 213 from printing manager 210. Along those lines, MFP engine 229 may receive PRCS print jobs 213 with raw PDL data, process such print jobs through engine RIP 223 firmware to generate a pre-rendered document image 125, and then upload such pre-rendered document image 125 to printing manager 210 for caching in a storage device, such as for example cache 211.

Printer 220 may receive a PRCS print job 213 as a signal print job. A signal print job 213 informs printer MFP engine 229 to retrieve a previously pre-rendered document image 125 from cache 211 in printing manager 210. MFP engine 229 may receive a PRCS print job 213 containing embedded therein a pre-rendered document image 125 from printing manager 210, such as for when printing manager 210 performs "push" printing.

Printing manager 210 in this example is a software service on a server computer, desktop computer, portable computing device (e.g., minicomputer, Raspberry Pi, or the like), cloud server or the like that interfaces between document editing applications, computers, mobile devices, a print driver 205, and MFP 220. printing manager 210 may be configured to: perform analysis of user printing preferences and printing history; perform pre-rendering of documents to achieve faster printing turnaround from document creation to receipt of printed paper at a printer or imaging device; and manage and handle the caching of pre-rendered document images in a centralized repository to make pre-rendered document images 125 available to many users and many printers.

In this example, PRCS engine 216 is a firmware component integrated in a printer or an imaging device, such as MFP engine 229 of MFP 220. PRCS engine 216 may be configured to: receive and process a PRCS print job 213 that includes print job parameters that instruct MFP engine 229 to pre-render tan incoming print job 213 at MFP 220 and submit a pre-rendered document image 125 for caching; and receive and process a PRCS signal print job 213 that instructs MFP engine 229 to retrieve a pre-rendered document image 125 from printing manager 210 cache 211 and print such pre-rendered document image 125 retrieved.

PRCS support in printer driver 205 may be provided by monitor app 206. In order to detect "idle times", such as for example when user is making changes to printer preferences and printer dialog settings, PRCS support via monitor app 206 may be integrated in printer driver 205. Monitor app 206 can run a monitoring service that detects when a printer preferences dialog or a printer dialog is opened by a user. During such interval of time in which either or both such dialogs are open, monitor app 206 can initiate tracking of print settings to be able to associate such print settings with a print job 213 to be generated. Then, monitor app 206 can cause pre-rendering of unmodified document parts or of entire document in background of computer 201 while a user is busy browsing through a printer preferences dialog or printer settings dialog. Monitor app 206 may be used for tracking print job printed through use of printer driver 205.

PRCS support in a client/consumer side interface 207 may be provided by monitor app 204. In order to detect "idle times" when a user is viewing, editing or modifying a currently loaded document in a document editing app 203 for example, PRCS monitor app 204 may be used. PRCS monitor app 204 may be integrated as a plug-in or may be developed as an integrated feature in an application, such as document viewer 202 or editing app 203. Monitor app 204 may then be able to interface, collaborate and notify a PRCS monitoring app 206 about user activities, such as changing contents on a page. In response, PRCS monitoring app 206 may be able to perform in advance of printing and in background pre-rendering of unaffected parts of such page or other unaffected pages. For no affected pages, PRCS monitoring app 206 may be able to perform in advance of printing and in background pre-rendering of an entire document.

PRCS system services 231 may be for communication with one or more mobile devices. Moreover, PRCS services as described herein may be in mobile devices (e.g., mobile phones, tablets, portable computers, or the like) or integrated in mobile applications to provide same or similar capabilities as a PRCS plug-in in a mobile app, such as in monitor app 204, or a PRCS printer driver component, such as in monitor app 206. Documents opened and printed in mobile devices or mobile applications may be tracked using PRCS services 231 for printing history and may be relayed to printing manager 210 for pre-rendering in advance of printing and in background for subsequent caching of generated pre-rendered document image 125.

For purposes of clarity by way of example and not limitation, use examples with reference to PRCS 200 of FIG. 2-5; however, other use examples with other PRCSs 200 may be used.

Again, a plug-in, such as monitor app 204 or 206 may be hosted in a computing device, such as computer 201 for example. While two monitor apps may be present as described herein, in another example a single monitor app in communication with a printer driver 207 and one or more apps of a client/consumer side interface 207 may be used.

A system service, such as printer driver 205 for example, may be operative by computer 201. Such system service may be configured for receiving commands from a plug-in monitor app 206 for example. Such a system service may be configured to issue an instruction responsive to a command from plug-in monitor app 206 to at least one of a printing manager, such as printing manager 210, or a printer engine, such as MFP engine 229. Such a printer engine may be configured to pre-render a document image 125 responsive to such an instruction. Such a printer engine may be configured to send such pre-rendered document image 125 to printing manager 210 for storage for subsequent retrieval and/or to print out such pre-rendered document image 125 on demand.

Such a system service may be configured to issue another instruction responsive to another command from plug-in monitor app 206 to at least one of a printing manager, such as printing manager 210, or a printer engine, such as MFP engine 229. Such a printing manager 210 may be configured to retrieve a pre-rendered document image 125 from cache 211 and to send such a pre-rendered document image 125 to MFP engine 229 responsive such other instruction. MFP engine 229 may be configured to print such a pre-rendered document image 125 onto a print medium responsive to such second instruction.

In an example, such a pre-rendered document image 125 may be from a document image that is an online document image used in generating a corresponding print job 213. Such a document image may be worked on by a user. An online document image may be viewable in an editing or viewing application operative and hosted by computer 201 or a network backend application in communication with computer 201.

A plug-in, such as a monitor app 204, may be configured to process an online document image in a background mode while viewable in an editing application or viewing application for providing a command for pre-rendering. A system service, such as printer driver 205, may be configured with a monitor app 206 to process an online document image in a background mode while viewable in an editing application or a viewing application for providing an instruction for pre-rendering.

Along those lines, a system service of computer 201 may be configured to issue an instruction to MFP 229 responsive to a command from monitor app 206. In response to such an instruction, MFP 220 may be configured to print a pre-rendered document image of at least a portion of an online document onto a print medium responsive to such an instruction. Such a pre-rendered document image may be resident in MFP 229 prior to issuance of a command to print same. In other words, pre-rendering may be performed prior to issuance of a print command, and a printer 220 may temporarily store a pre-rendered portion of a document for example prior to issuance of a print command therefor.

MFP engine 229 may be configured to receive and pre-render an offline document image to provide a pre-rendered offline document image therefor. MFP engine 229 may be configured to send such a pre-rendered offline document image to printing manager 210 for storage in cache 211. Printing manager 210 may be configured to cache a pre-rendered offline document image in cache 211 obtained from MFP engine 229.

In another example, a plug-in, such as monitor app 204 and/or 206, may be hosted in computer 201, where computer 201 optionally includes an image processor 209. Again, a system service operative by computing device 201 may be configured for receiving commands from such a plug-in. In this example, image processor 209 may be configured to pre-render a document image responsive to a command of commands from such a plug-in.

A system service, such as printer driver 205, may be configured with monitor app 206 to issue an instruction responsive to a command from a plug-in, such as monitor app 204. Such an instruction may be issued to at least one of printing manager 210 or MFP 229 networked with computer 201. MFP 229 may be configured to receive and print a pre-render document image 125 output from image processor 209 responsive to such an instruction. Such a pre-render document image 125 output may be directly provided to printer 220 or pass to printer 220 through printing manager 210. Along those lines, computer 201 or printer 220 may be configured to send such an image processor output of a pre-rendered document image 125 to printing manager 210 for storage in cache 211.

In the example of FIG. 2-2 for example, printing manager 210 is a centralized management software implemented on a server, such as a file or web server, for coordinating handling of print jobs 213 in a PRCS system 200. Print manager or printing manager 210 is configured to receive print jobs 213 for pre-rendering, and to pre-render such print jobs to convert them to corresponding pre-rendered document images 125 in printing manager 210.

In the example of FIG. 2-2, printing manager 210, such as when hosted in an external device, may include a RIP 223 implemented in software to translate an incoming print job 213 into pre-rendered document image 125.

In the example of FIG. 2-3 for example, printing manager 210 may receive a pre-rendered document image 125 from MFP 229 of printer 220 for caching in cache 211. In this example, print jobs 213 may be pre-rendered in an actual printer engine with having printer engine supporting components. Print jobs 213 pre-rendered in MFP engine 229 can be uploaded back to printing manager 210 for caching.

Printing manager 210 may be configured to manage caching of pre-rendered document images 125. Pre-rendered document images 125 may be stored in a database 214 in, in direct communication with, or in indirect communication with printing manager 210, such as for example an internal hard drive, an external hard drive, a shared network storage, a cloud storage, or other storage that can provide effective accessibility to printing manager 210.

In another example, a storage format may be a different format than a database. For example, a file system with hash-table for look-up of most frequently used documents or most-recently used documents may be used. In another example, a mix of a database with a file-system directory may be used, where such database contains cacheable job attributes or parameters such as a print job identifier, a document name, a path name, and so on. A remainder of actual files for pre-rendered document images may be in a file system, indexed and pointed to from their respective entries in such database.

Printing manager 210 may download or provide pre-rendered document images during "pull" or "on-demand" printing in printers with an MFP engine 229 configured to support a PRCS system 200. In this configuration, printing manager 210 may download or provide one or more pre-rendered document images in response to a "push" printing command from a printer driver with PRCS support, such as printer driver 205 configured with monitor app 204.

Printing manager 210 may be hosted in a host device, such as a server, or may be implemented as a standalone device. As a standalone device, printing manager 210 may provide centralized services for coordination of print jobs 213 and caching of pre-rendered document images 125 in a network. For this configuration, printing manager 210 may be installed, hosted and run in a standalone device, such as a central server computer. Other examples of a standalone device include designated desktop computers, laptops, tablets, portable computing devices (such as minicomputers, Raspberry Pi and the like), or custom standalone computers (without monitor or display, such as Linux boxes) among others. Other examples of a standalone device include other network devices including Cloud servers or virtual servers that can host and run printing manager 210 services.

An external or internal hard-drive may be connected to a standalone device configured with printing manager 210 services for storing or caching pre-rendered document images 125. Other types of storage such as a database 214 or combination of a file system and database may likewise be used for storage and caching of pre-rendered document images 213.

In another configuration, printing manager 210 may optionally be hosted in a host device, such as computer 201 for example as generally indicated by hosted dashed line 215. In a software implementation of printing manager 210, printing manager software may run on a computer 201, and so printing manager 210 may be hosted and run on such a host device. Computer 201 may be a desktop computer, a tablet, or a laptop for example where one or more document editing applications and one or more printer drivers reside, such as editing app 203 and printer driver 205 for example. A hosted device configuration for printing manager 210 allows for pre-rendering of documents to happen directly and locally at a host device. Generated pre-rendered document images 125 can be cached in such same host device 201, or relayed to a standalone device with printing manager 210 as previously described, that supports a caching system of PRCS 200.

A printer/MFP engine 229 may include a PRCS engine 216. In an example, PRCS engine 216 may be printer firmware that interfaces with RIP 223 firmware for example to process incoming print jobs 213, which can be PRCS print jobs 213. PRCS engine 216 may be configured to receive print jobs 213 that are marked or flagged with a PRCS pre-rendering command such as by printer driver 205 and to receive non-PRCS print jobs 213 sent from printer driver 205.

PRCS engine 216 may be a firmware component configured to receive and process a print job including parameters instructing a printer engine to pre-render such a print job and submit such a pre-rendered print job for caching. PRCS engine 216 may be a firmware component configured to receive and process a print job instructing a printer engine to retrieve from cache a previously pre-rendered document image associated with such a print job and to print such a pre-rendered document image.

PRCS engine 216 may receive PRCS print jobs 213, which may include a PRCS job parameter to pre-render such print job. PRCS engine 216 and RIP 223 may both be configured to discover a PRCS print job parameter to pre-render such a print job. A pre-rendered document image 125 may be generated at printer/MFP engine 229. Such a pre-rendered document image 125 may be uploaded to printing manager 210 for caching.

PRCS engine 216 may be configured for receipt of a PRCS command job to print a previously pre-rendered print job. A PRCS command job received from a printer driver tells PRCS engine 216 to do a "pull" or an "on-demand" printing of an associated document. PRCS engine 216 may send a request to retrieve a pre-rendered document image from printing manager 210 cache 211. In response, printing manager 210 may download such a pre-rendered document image 125, such as back to PRCS engine 216 if previously pre-rendered by MFP engine 229. PRCS engine 216 may relay such a pre-rendered document image down to a video layer for development and actual rendering onto a print medium, such as paper for example. RIP, GRS, and higher-level PDL processing may be skipped since those have already been done during pre-rendering of an original print job for such pre-rendered document image. For a push printing mode, PRCS engine 216 may be configure to receive a print job 213 in a page description language having an embedded pre-rendered document image 125 from printing manager 210.

Printing manager 210 may be a software service hosted by a server computer, a desktop computer, a portable computing device, or a cloud server. For example, printing manager 210 may be a software service configured to interface between at least one document editing app and at least one of a computer, mobile device, printer driver, or a printer engine. Printing manager 210 print manager may be configured to analyze user printing preferences and user printing history.

Printer driver 205 may be configured to relay a print job 213 with PDL data to a printing manager 210 hosted by a computer server or a standalone computer for pre-rending and caching in advance of printing and in background of such computer server or standalone computer. A printer engine 229 may be configured to receive a print job in a page description language and to process such print job through an image processor of such printer engine to generate a pre-rendered document image. Such printer engine 229 may be configured to upload such a pre-rendered document image to printing manager 210. In the example of FIG. 2-2, printing manager 210 is configured to pre-render a document and then cache such a pre-rendered document in cache 211.

PRCS services may be configured for tracking and relaying of a candidate offline document for at least one document in a file or web server for pre-rending and caching in advance and in background. Again, such PRCS services may include a monitoring service configured to detect an open printer preferences dialog or printer dialog to initiate tracking of print settings during an idle time. Print settings may be tracked in association with a print job to be generated, as a print command has yet to be asserted for same. A plug-in or integrated app may be in communication with PRCS services to notify such system services regarding of at least one detected idle time to initiate pre-rendering in advance of assertion of a print command during such idle time. During such idle time, such pre-rendering may be performed in a background mode of a computing device, where unaffected parts of a page or pages of such at least one document are pre-rendered.

PRCS print job 213 may contain any one of at least three formats: a PRCS print job 213 with PDL data; a PRCS print job 213 as signal print job 213, namely empty; or a PRCS print job 213 with a pre-rendered document image 125. For a PRCS print job 213 with PDL data, the first version of data generated through printing manager 210 may be a PRCS print job 213 containing raw PDL data. This format may allow compatibility with current or existing PDLs, so that printing performance of existing PDLs may be improved through use of PRCS technology.

PRCS services in a printer driver 205 or a PRCS plug-in or a feature in document editing app 203 may work to generate a PDL print job 213 in background. A pre-generated print job 213 may be called a PRCS print job 213. Such a pre-generated print job 213 may contain raw PDL data that is meant to be processed through an integrated RIP in printing manager 210, if it exists, or at a printer engine 229 when a PRCS engine 216 thereof receives a PRCS print job 213.

A PRCS print job 213 may have a pre-rendered document image 125 as generated using computer 201. PRCS services in a printer driver 205 or PRCS plug-in or embedded feature in document editing app 203 may directly generate a PRCS print job 213 so that it ultimately contains a pre-rendered document image 125. For example, for PRCS services or plug-in or embedded feature, such as monitor app 206 or 204, configured to interface and send page description data to printing manager 210 with an integrated RIP 223 of a pre-rendering engine 212, editing app 203 may directly generate a PRCS print job 213 that contains a pre-rendered document image 125 with pre-rendering performed by pre-rendering engine 212.

In another example, page description data may be packaged as PDL print job 213 but which is sent in background and in advance of printing to printing manager 210 or PRCS engine 216 for pre-rendering. For this example format, where printing manager 210 may pre-render a document, printing manager 210 may also be configured to package a pre-rendered document image 125 and "push" such pre-rendered document image 125 to printer 220 for printing. Printing manager 210 may package a pre-rendered document image 125 as a PRCS print job 213.

FIG. 3-2 is a block-flow diagram depicting an example of a printing manager system 310 for performing printing manager operations 320. The flow diagram of FIG. 3-2 is further described with simultaneous reference to FIGS. 1 through 3-2.

In printing manager system 310, a server 315, which may be a computing device as described elsewhere herein, has memory 311 configured to store program code 312 to provide a printing manager 210. At least one processor core of cores 313 of server 315 is coupled to such memory 311 for communication therewith, wherein such at least one processor core, in response to executing such program code 312, may be configured to initiate operations for implementing such printing manager 210.

Along those lines, server 315 may receive a print job 213, which may be an operation 321 of printing manager operations 320. Program code 312 in response to receiving a PRCS flagged print job 213 with a format described above may initiate a pre-rendering operation 322 of such print job 213 to convert same into or otherwise generate a first document image 125-1 for such print job. Pre-rendering operation 322 may include a raster image processing operation 332 to process such a print job 213 with an image processor, such as previously described herein.

At caching operation 324, such a first document image 125-2 may be temporarily stored in cache 211 of server 315. However, another document image may be pre-rendered such as by a printing device for example for storing in cache 211 of server 315.

Along those lines, a second document image 125-2 may be received by server 315 to provide to a printing manager at operation 323. Such a second document image 125-2 may be provided from a printer engine 229, such as previously described herein.

At caching operation 324, such a second document image 125-2 may be temporarily stored in cache 211 of server 315. Caching operation 324 may include a storing operation 334 for storing such a first document image 125-1 or a second document image 125-2 in a database 331 associated with cache 211.

In another example, caching operation 324 may include a storing operation 334 for storing first document image 125-1 or second document image 125-2 in a file system 338 with an index 339 accessible with pointers 337. Such an index 339 accessible with pointers 337 may for example be a hash-table 339 with hashes 337 for look-ups. Moreover, in such an example such hashes 337 may include at least an identifier 336 of a print job 213 associated with such a document image.

At downloading operation 325, a first document image 125-1 or second document image 125-2, generally document image 125 for example, may be downloaded from cache 211 to a printer engine 229 responsive to a push printing command 326, such as a push printing command may be from a printer driver 205 provided to printing manager 210. Along those lines, pre-rendering and storing of a document image occurs prior to receiving a command to print for push printing. Downloading operation 325 may include a determining frequency of access or use operation 335 to determine a frequency of access or use 333 for such each document image downloaded, which may be updated each time such corresponding document image is downloaded.

Such frequency of access may be provided to a file system 338 or a database 331. In yet another example, caching operation 324 may include a storing operation 334 for storing a document image 125 in either a file system 338 or a database 331 responsive to a frequency of access 333 of such document image 125. Along those lines, more frequently accessed document images may be stored to be more readily accessible than less frequently accessed document images.

Server 315 may be in a standalone cloud or be a virtual server, where at least one processor core of cores 313 is in a standalone cloud or virtual server. Though cache 211 is illustratively depicted as internal to server 315, cache 211 may be internally or optionally externally coupled to server 315.

FIG. 3-3 is a block-flow diagram depicting an example of a printing system 340 for performing printing operations 350. The flow diagram of FIG. 3-3 is further described with simultaneous reference to FIGS. 1 through 3-3.

In printing system 340, a printing device 345, which may be a printing device as described elsewhere herein, has memory 341 configured to store program code 342 to provide a printer engine, such as PRCS engine 216 for example. In an example, such a printer engine may be program code 342 stored in firmware of printing device 345. Such a firmware printer engine may be configured to interface with an image processor of printing device 345, as previously described herein.

At least one processor core of cores 343 of printing device 345 may be coupled for communication with memory 341, wherein such at least one processor core, in response to executing such program code 342, may be configured to initiate operations 350 for implementing such printer engine.

Along those lines, printing device 345 may receive a print job 213 marked with a pre-rendering flag, which may be an operation 351 of printing operations 350. Program code 342 in response to receiving a PRCS flagged print job 213 with a format as described above may initiate a pre-rendering operation 352 of such print job 213 to convert same into or otherwise generate a document image 125. Pre-rendering operation 342 may include a raster image processing operation 332 for processing a print job 213 with an image processor, such as previously described herein.

Operation 342 may pre-render print job 213 into a document image 125 with a printer engine provided by program code 342 responsive to a job parameter included with such print job. At caching operation 354, such a document image 125 may be sent to and temporarily stored in cache 211 of printing manager 210. Caching operation 354 may be for storing such document image 125 in cache 211 or in a database or file system, as previously described herein, associated with a printing manager.

At operation 351, another print job 213 may be received where such print job does not contain any page description language data. This configuration of a print job designates same as a signal print job. Effectively receipt of a signal print job may be interpreted or processed the same as receipt of a push command for a document image 125 already pre-rendered and cached or otherwise stored in association with a printing manager cache 211. Optionally or additionally, a push command 326 may be received by printing device 345 and processed the same as a signal print job. Accordingly, for purposes of clarity and not limitation, processing of a signal print job is described below, as such processing is the same for receipt of a push command 326.

In response to such a signal print job, a downloading operation 355 may be used to send a request 357 to printing manager 210 for a document image 125 identified by such signal print job and to download such a document image 125 from printing manager cache 211 or a database or a file system thereof to a printer engine, such as PRCS engine 216 for example. At a printing operation 356, such downloaded document image 125 may be directly relayed or otherwise directly sent to a video layer for a page description language level for development and actual rendering onto a print medium. Again, pre-rendering and storing of a document image occurs prior to receiving a command to print for push printing, whether a push printing command or a signal print job.

FIG. 4-1 is a code listing diagram depicting an example of a PDL listing 400 augmented with PRCS job parameters 401. FIG. 4-2 is a block diagram depicting an example of a print job 213. PDL listing 400 and print job 213 are further described with simultaneous reference to FIGS. 1 through 4-2.

A PRCS print job 213 with raw PDL data may be a print job type or file format prior to pre-rending for eventual input to a rendering component, namely a print job for pre-rendering. A printer driver, an application plug-in or a system service can generate a PDL print job 213 ahead of printing for advance processing in a printing manager 210 or printer engine 229. A PRCS print job 213 with PDL data may be sent to background when a printer driver, an application plug-in or a system service cannot perform pre-rendering directly in a host device, such as for example a computer, tablet, mobile, laptop, or the like.

A PRCS print job 213 with raw PDL data file format may include a header 408 for such file. A header 408 may contain an identifier 402 that identifies such a print job has been generated for PRCS processing, such as described elsewhere herein. Such a header 408 may further contain other print job parameters 453 for PRCS processing. For example, a header 408 may, in addition to an identifier 402, include a mode 403, a job identifier 404, and a cache action 405. A mode setting in a header 408 may be set to ON to cause downstream processing to pre-render such a print job. If a mode setting is not set to ON, then such a print job may not be pre-rendered, namely not rendered prior to assertion of a print command.

A print job or job identifier 404 may be an index to identify a particular job in a printer engine 229, cache 211, or elsewhere in a PRCS system. A cache action 405 may be set to ON to cause downstream processing to cache an image of such print job to be cached, such as in cache 211, after pre-rendering. If a cache action is not set to ON, then such a print job may be printed more immediately after pre-rendering, namely without first caching same.

Additionally, a PRCS print job with raw PDL data may include at least one data page 409, such as data pages 1 through N pages, for N a positive integer inclusive of 0, of PDL data 419 for such a print job. As a paged is not yet pre-rendered, such one or more pages may contain PDL data.

Another type of a PRCS print job 213 may be a format having pre-rendered document image 125. Such a PRCS print job 213 may have a pre-rendered document image file format generated in a printing device or a printing manager, for example, with binary data for pre-rendered pages. Each pre-rendered page image includes a binary representation of an associated page, which is referred to hereinafter as a pre-rendered page image.

In addition to one or more pre-rendered page images, a pre-rendered document image print job 213 file format may include a header 408 having a PRCS identifier, a mode setting, a job identifier, and a cache action, as previously described with reference to a PRCS print job 213 with raw PDL data file format.

When a printer driver, an application plug-in or a system service has integrated support for pre-rendering to create a pre-rendered document image locally or directly in a host device such as a computer, tablet, mobile, laptop or the like, then a print job 213 may more readily or immediately be transformed into a pre-rendered document image format. However, if a host device does not have integrated pre-rendering support, then a PRCS print job 213 with PDL data may be sent to a printing manager 210 or a printer engine 229, for example, for pre-rendering and possibly caching, as previously described elsewhere herein.

More particularly, pre-rendered document images obtained for example from a printing manager 210 may be in a format that is ready for printing, namely in a compressed binary, engine-compliant representation of one or more document pages. Processing through an RIP, such as for parsing, PDL interpretation, graphics rendering and graphics order processing, may be skipped as same may not be necessary. Such a pre-rendered document image file can be directly processed through a video component in a printer engine 229. A pre-rendered document image file may be cached for example in a shared network storage, in cloud storage, or in an MFP internally or an externally connected hard-drive.

Yet another print job format type is a PRCS signal print job 213. A signal print job 213 may be generated in a printer driver, an application plug-in, a system service or printing manager as a host in a standalone computer, a portable computer, a laptop, a cloud device, or a server. A signal print job 213 can for example be sent from a feature integrated in a printer driver, an application plug-in, a system service, a host printing manager, or a standalone printing manager. A signal print job 213 may be sent to either a standalone printing manager or to a printer engine to start retrieval of a cached pre-rendered document image for printing.

A file format for a signal print job may include a single page, formatted for binary, having no data, namely empty. Essentially a signal print job 213 is empty with respect to document data, and thus may contain just print job parameters to instruct a printing manager or printer engine on what to do. However, a signal print job 213 does include a header 408 having a PRCS identifier, a mode setting, a job identifier, and a cache action, as previously described with reference to PRCS print job 213 with raw PDL data and pre-rendered document image print job 213 file formats. However, a mode setting for a signal print job 213 is OFF, as such a print job has already been pre-rendered. A cache action is ON or asserted for a signal print job, but not for caching; rather, for a signal print job 213 have a cache action ON status, a printer engine 229 or a printing manager 210 is instructed to retrieve a pre-rendered document image from cache for immediate printing thereof.

Job parameters for PRCS print jobs 213 for any or all of the above-described file formats may be implemented. As previously indicated, addition of PRCS job parameters may facilitate identification of pre-rendered print jobs at host computers or at printer engines to determine if a print job is to be cached or processed for immediate printing. Any and all PDLs with support for PRCS job parameters may be candidates for pre-rendering, and this may include PCL5, PCL6 (XL), PDF, XPS, OpenXPS, PPML, AirPrint/URF, Kyocera PRESCRIBE, or like PDLs.

PRCS job parameters may be in one or more combinations of @PJL, XPS PrintTickets or Kyocera PRESCRIBE commands for example. A printing manager 210 and/or a printer engine 229 may be configured to understand and process such PRCS job parameters, such as for example to pre-render then cache a print job, to have RIP firmware perform immediate processing, or other processing as described elsewhere herein.

In an example implementation, added job parameters may distinguish PRCS print jobs 213 generated through a PRCS system from a conventional printing system. Such print job parameters include a PRCS identifier, a mode setting (i.e., pre-rendering or not), a job identifier, and a cache action, as previously described with reference to print job 213 file formats. Another job parameter which may be included is a job path code 406. For example, a PRCS "JobPathQRCode" may be used, where such a job parameter may be an encoded QR code that identifies the path of an original document that was printed. This is just one example of an original document path code, and other types of codings may be used in other examples in accordance with the description herein.

In this example, PRCS job parameters 401 use an @PJL setting; however, in other examples other types of PDL codings may be used. PRCS job parameters include examples of a PRCS identifier 402, a mode setting 403, a job identifier 404, a cache action 405, and a job path code 406. Particular examples of each of such job parameters are provided for purposes of clarity by way of example and not limitation, as other examples may be used. Moreover, codings 407 are provided for context as examples of conventional information using @PJL codings and again are provided for purposes of clarity by way of example and not limitation, as other examples may be used.

Optionally, other information may be included, such as for example document name, file name, timestamp of prerendering, and/or CRC code for encoding all of the information of a file to ensure the same document is to be processed. These or other job parameters may be added to facilitate more efficient processing, management and/or coordination of print jobs, communication between PRCS system components, such as printing manager 210 and printer engine 229, and/or one or more PRCS features in printer drivers, application plug-ins or system services.

A PRCS identifier 402 may be a code that identifies a print job 213 is a PRCS type of print job rather than a conventional or legacy print job. A PRCS identifier 402 indicates to a printing manager 210 and/or printer engine 229 such a print job may be processed as a PRCS print job. In the absence of a PRCS identifier 402 code in a print job, such a print job may be treated as a regular, legacy print job, which processing may match any PDL print job such as PCLXL, PCL, PostScript, PDF, XPS, or the like. Such a regular, legacy print job may be processed in a conventional manner RIP firmware (i.e., through Interpreter, graphics processing, graphics order execution unit, ASIC, and so on) when such a conventional print job is received at a printer engine 229. This allows for backward compatibility of current print jobs or print drivers that do not have support for a PRCS system.

With the presence of a PRCS identifier 402 job parameter, a print job 213 may be identified as a valid PRCS print job. A PRCS identifier 402 may be in byte-array, hexadecimal, numeric, alphanumeric or other binary code that is compatible with the content of a print job. For example, if a printer driver generates PCLXL print job, a PRCS print job 213 may include a binary alphanumeric code as value for a PRCS identifier. On the other hand, if a printer driver generates an XPS print job for example, it will be a binary code in an XML format. For purposes of clarity by way of example and not limitation, examples of usage of a PRCS identifier are listed below, when using a hexadecimal code for a "PRCSJOB" is used as possible value: PJL example—@PJL SET PRCS_Identifier=535052434A4F42; XPS example—<psf:Parameterinit name="psk:JobPRCSIdentifier">, <psf:Value>535052434A4F42</psf:Value>, </psf:Parameterinit>: and PRESCRIBE example—SPRI 535052434A4F42, wherein SPRI is a shortened keyword for PRCS identifier.

A PRCs mode setting 403 identifies whether a print job 213 is to be pre-rendered or not. In this example, values for this parameter are either ON or OFF. However, other codes can be used, such as Yes or No, or True or False, or 1 or 0.

When a PRCs mode setting 403 value is ON (or Yes, True, or 1), this signals that a print job is to be pre-rendered when received at a destination therefor. The destination can be a print manager at a host device, an print manager at a separate standalone device (such as server, portable computer, Cloud device, virtual machine, or the like) or at a printer engine. When a PRCs mode setting 403 value is OFF (or No, False, or 0), this signals that a print job is not to be pre-rendered when received at a destination therefor. For purposes of clarity by way of example and not limitation, examples of usage of a PRCS mode are listed below, when using ON as possible value: PJL example—@PJL SET PRCS_Mode=0N; XPS example—<psf:Parameterinit name="psk:JobPRCSMode">, <psf:Value>ON</psf:Value>, </psf:Parameterl nit>: and PRESCRIBE example—printing manager 210 ON, wherein printing manager 210 is a shortened keyword for PRCS mode, with the 'M' standing for mode.

A PRCS job identifier 404 may be a unique code within a context that identifies each generated PRCS print job 213. For example, a PRCS job identifier 404 may be a counter value provided by a printing manager 210, where PRCS JoblDs can be generated in a centralized service, or a PRCS job identifier 404 can be a GUID-value that is guaranteed to be unique.

A PRCS job identifier 404 value may be used to identify or index to a print job being stored in cache 211 or when retrieving a pre-rendered document image 125 from such cache. For purposes of clarity by way of example and not limitation, examples of how a PRCS mode are listed below, when using GUID as possible value: PJL example—@PJL SET PRCS_JoblD=(2c493103-1131-429c-9e84-fc236178afaa); XPS example—<psf:Parameterinit name="psk:JobPRCSJobID">, <psf:Value>(2c493103-1131-429c-9e84-fc236178afaa)</psf:Value>, </psf:Parameterinit>: and PRESCRIBE example—SPRJ {2c493103-1131-429c-9e84-fc236178afaa}, wherein SPRJ is a shortened keyword for PRCS JoblD, with the 'J' standing for job.

A PRCS cache action 405 identifies whether a print job is to be cached, or whether a pre-rendered document image is to be retrieved from cache, or whether caching does not apply for a print job. A possible value for this parameter is either ON or OFF. Other codes can be used such as Yes or No, or True or False, or 1 or 0.

When a value of a cache action job parameter is ON (or Yes, True, or 1), a value of a PRCS mode parameter is also checked or ON. If a PRCS mode is ON, that signals that a print job contains raw PDL data and that such print job is to be pre-rendered before caching. Once pre-rendering is done, and a pre-rendered document image is generated and obtained, and then such pre-rendered document image may be sent to a printing manager 210 for caching.

On the other hand, if a PRCS mode is OFF or not asserted or non-asserted, that signals that a print job is a signal print job and that a pre-rendered document image may be retrieved from cache 211. Once such a pre-rendered document image is retrieved from cache, such a pre-rendered document image may be sent to a printer engine 229 for rendering onto a print medium, such as paper for example.

When a value of a cache action job parameter is OFF (or No, False or 1), a value of a PRCS mode job parameter may likewise be expected to be OFF. This combination signals that a print job is a conventional PDL print job and may be a pass-through type print job that may be relayed to a printer for regular processing through an RIP.

While it is possible to assign a value of ON for a PRCS mode job parameter even when a corresponding PRCS cache action is OFF, the usage of such a combination is not efficient as described herein. That is because, when a PRCS cache action is OFF but a corresponding PRCS mode is ON, that signals pre-rendering to generate a pre-rendered document image, which is not to be cached but rather printed immediately at a printer engine. However, time spent to generate a pre-rendered document image would be an overhead and extra time compared to simply regular printing of a PDL print job. Thus, this combination is not likely to be employed in a PRCS system as described herein. A PRCS feature supported in a printer driver, an application plug-in, or a system service may be configured to not generate PRCS print job with this combination of ON for a PRCS mode and a corresponding PRCS cache action OFF.

Examples of usage of PRCS cache action are listed below, when using ON as a possible value therefor: PJL example—@PJL SET SPRC_CacheAction=ON; XPS example—<psf:Parameterl nit name="psk:JobSPRCCacheAction">, <psf:Value>ON</psf:Value>, </psf:Parameterinit>; and PRESCRIBE example—SPRC ON, wherein SPRC is a shortened keyword for PRCS Cache Action, with the 'C' standing for cache.

Knowing a location of an original document used to generate a PRCS print job, specifically, a PRCS print job 213 with PDL Data may be useful, and so a PRCS JobPathQR-Code for example may be used. A reason such a path may be useful is that knowing this information by a printing manager 210 may allow same to identify if a document is being opened for printing multiple times, including such as from one or more different locations (e.g., PCs, mobiles, tablets, web apps) to one or different printers. A document location can be in a local directory in a desktop computer, or a path name to a shared network drive with other shared documents, or a URL to a webpage or the like.

Encoding using a coding technology, such as for example a QR Code technology, may be used for providing such a location. Other ways to a identify source location of an original document may be used, including using plain text, hexadecimal encoding, CRC encoding, encrypting, and/or compressing, among other means.

Examples of usage of SPRC JobPathQRCode are listed below, when using binary data as a possible value: PJL example—@PJL SET SPRC_JobPathQRCode=[binary-data]; XPS example—<psf:Parameterinit name="psk:JobSPRCJobPathQRCode">, <psf:Value>[binarydata]</psf:Value>, </psf:Parameterinit>; and PRESCRIBE example—SPRP [binarydata], wherein SPRP is a shortened keyword for PRCS JobPathQRCode command, with the 'P' standing for path.

As previously described, PRCS print jobs 213 may be handled in any of a pass-through, a pre-render and cache, or a print pre-rendered document image.

A pass-through print job 213 may be used to perform conventional printing. This is done by setting a print job as a pass-through print job. A printer driver or PRCS service may set the following job parameters or print tickets to generated a PDL print job: PRCS Identifier—an identifier is added in job parameters to identify that such print job has been processed in a PRCS system; PRCS mode—set to OFF signaling such print job is not to be pre-rendered; PRCS JobID—optional, as this may be used to assign a Job ID for such print job; PRCS cache action—set to OFF to signal that such print job is not to be cached (because such print job is also not to be pre-rendered, this print job is to be processed in an RIP as is known for directly printing; and PRCS JobPathQRCode—optional, as this may be set with encoded data identifying the path or location of an original document used to create or source such PRCS print job 213.

Pre-render and cache print jobs 213 may be used when a pre-rendering feature to generate a pre-rendered document image 125 is to be performed in printing manager 210 or printer engine 229. Printer drivers, application-plug-ins, system services, and/or file servers with PRCS support can send PRCS print jobs 213 to either printing manager 210 or to printer engine 229 for pre-rendering and eventual caching of an associated pre-rendered document image. Continuing the above example, for this type of print job 213, the following job parameters or print tickets may be set: PRCS identifier—an identifier is added in job parameters to identify that a print job has been processed in a PRCS system; PRCS mode—set to ON to signal that this print job is to be pre-rendered when received; PRCS JobID—is set and assigned as print job identifier for such print job, and subsequently be used to cache such print job in a printing manager 210 system; PRCS cache action—set to ON to signal that such print job is to be cached; and PRCS JobPathQRCode—set with encoded data identifying the path or location of an original document used to create or source such PRCS print job 213.

If a pre-render and cache type of print job 213 is received in printing manager 210, printing manager 210 may perform pre-rendering in a device hosting a printing manager 210, including a hosting device having an integrated RIP in software and/or hardware. Printing manager 210 can be in a print server, a system server or a standalone device for example. If there is not integrated RIP for printing manager 210 to locally access, printing manager may relay such print job to printer engine 229, as previously described herein.

If a pre-render and cache type of print job 213 is received in printer engine 229, printer engine 229 may pre-render such print job through RIP firmware to create an associated pre-rendered document image 125. Printer engine 229 may perform pre-rendering using RIP firmware and hardware ASIC local printing device resources. Once a pre-rendered document image 125 is generated by printer engine 229, such pre-rendered document image 125 may be upload printing manager 210 for caching, namely without printing such image immediately after rendering.

For configurations where a printer driver, an application plug-in or a system service in a host device (e.g., computer, tablet, laptop, mobile, or the like) have built-in pre-rendering support, such as for example printing manager 210 and an integrated RIP, such as for example RIP 223, in host device, then pre-rendering may be performed locally in such host device. Caching could be performed in a host device or in a centralized server, for example when printing manager 210 is in a server. In some configurations, a pre-rendered document image may be forwarded to where a caching system exists.

Another type of print job 213 may be used for printing an existing pre-rendered document image 125. Generally eventually, a cached pre-rendered document image may be printed. Since pre-rendered document images are cached in printing manager 210, printing manager 210 may be signaled to print a pre-rendered document image thereof. This signal can come directly to printing manager 210 or can come from a printer engine 229. In both instances, a signal sending entity, which can be one of printer drivers, application-plug-ins, system services, file servers or printing manager 210 that supports this PRCS feature, can send a print job that contains such signal to print an existing pre-rendered document image.

Continuing the example, for this type or print job, job parameters may be set as follows: PRCS Identifier—an identifier is added in job parameters to identify that a print job has been processed through a PRCS system; PRCS Mode—set to OFF which signals that such print job is not to be pre-rendered (as it is already pre-rendered); PRCS JobID—is set and assigned as job identifier for such print job as it may be used to identify an associated pre-rendered document image cached in a printing manager 210 system; PRCS Cache Action—set to ON to signal that such print job was cached and is to be retrieved as a cached pre-rendered document image; and PRCS JobPathQRCode—set with encoded data identifying the path or location of an original document used to create or source such PRCS print job 213.

Because a PRCS Mode is OFF and a PRCS Cache Action is ON, this signals that a pre-rendered document image 125 is ready to be printed. If a signal print job is received in printer engine 229, printer engine 229 performs a "pull" or "on-demand" printing to retrieve a pre-rendered document image 125 from printing manager 210 cache. Once a pre-rendered document image 125 is received by printer engine 229, such pre-rendered document image 125 may be sent down to a lower pipeline in a printing device, such as to a video component, for actual rendering onto a print medium, such as paper. If a signal print job is received in printing manager 210, printing manager 210 may perform a "push" printing operation to retrieve a pre-rendered document image 125 from printing manager 210 cache and send such retrieved pre-rendered document image to a printing device for printing onto a print medium, such as paper. While actual printing to a print medium has been described, such description is not limited to actual printing; rather, a pre-rendered document image 125 may be sent to a printing device for virtual printing, such as for electronic distribution of a virtually printed document.

Printing manager 210 may be configured to perform; a print history analysis; a pre-rendering of a document; and a caching of a pre-rendered document image.

Figures 2, 3, 4, 5:
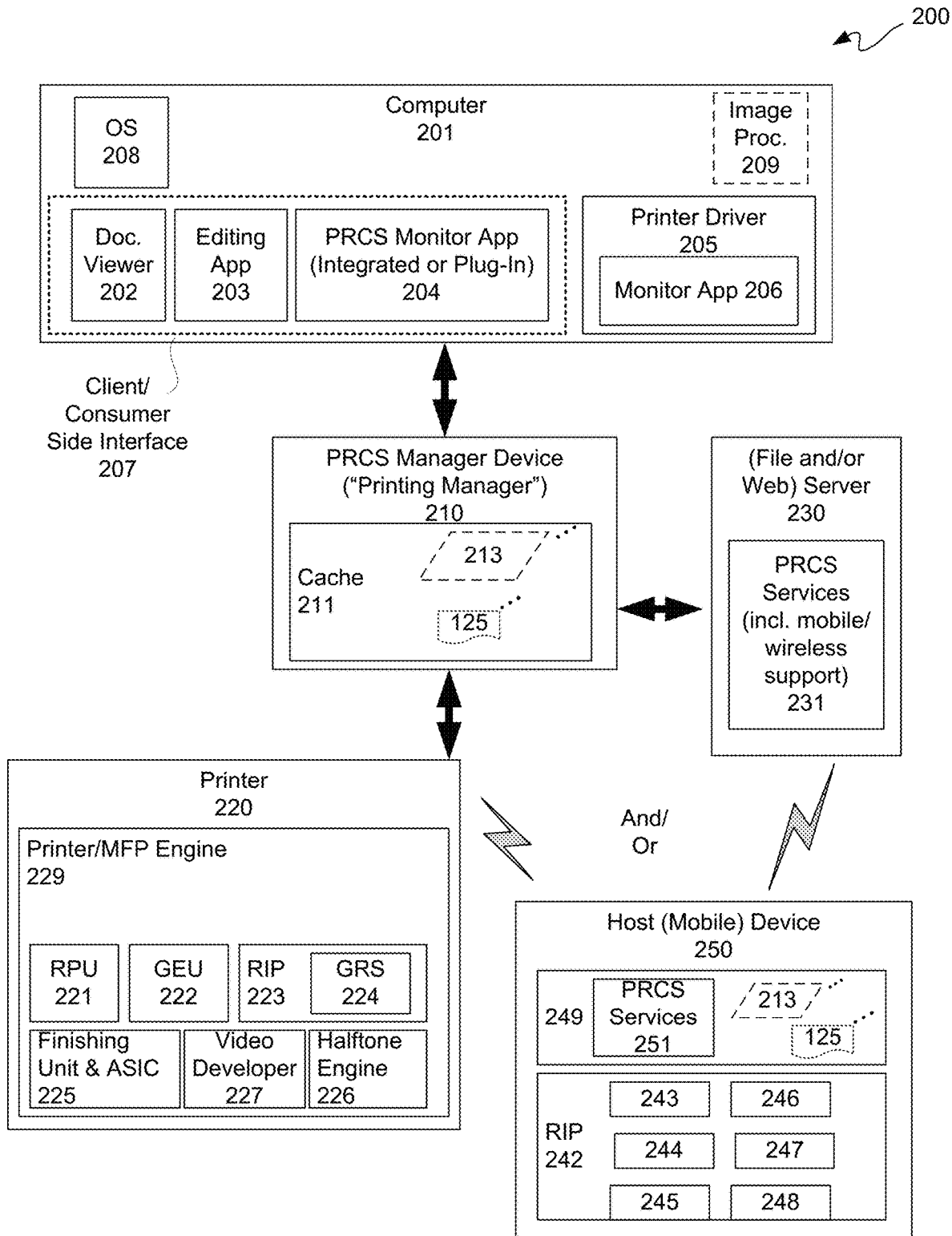
Figures 1, 3:
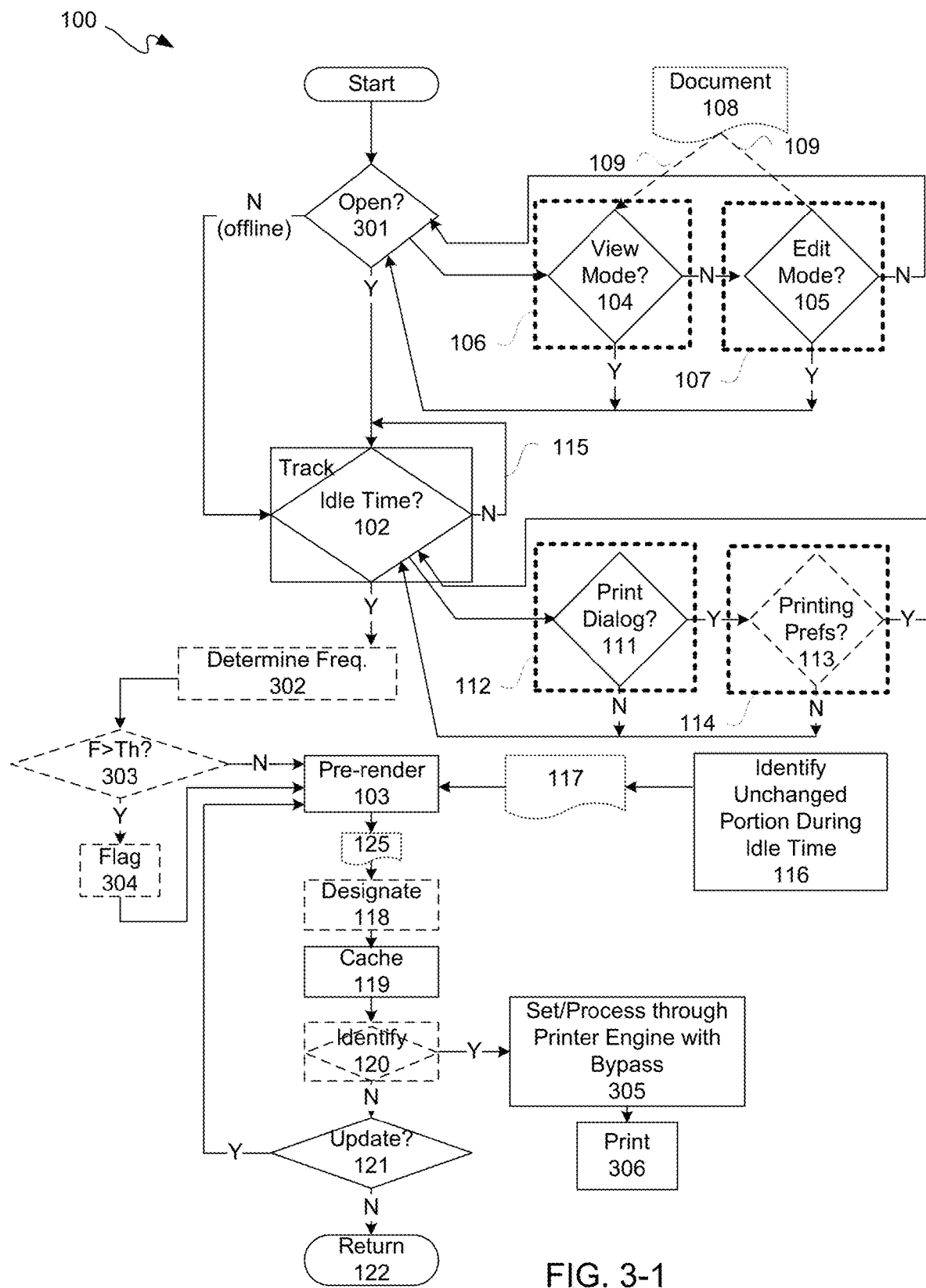
Figures 2, 3:
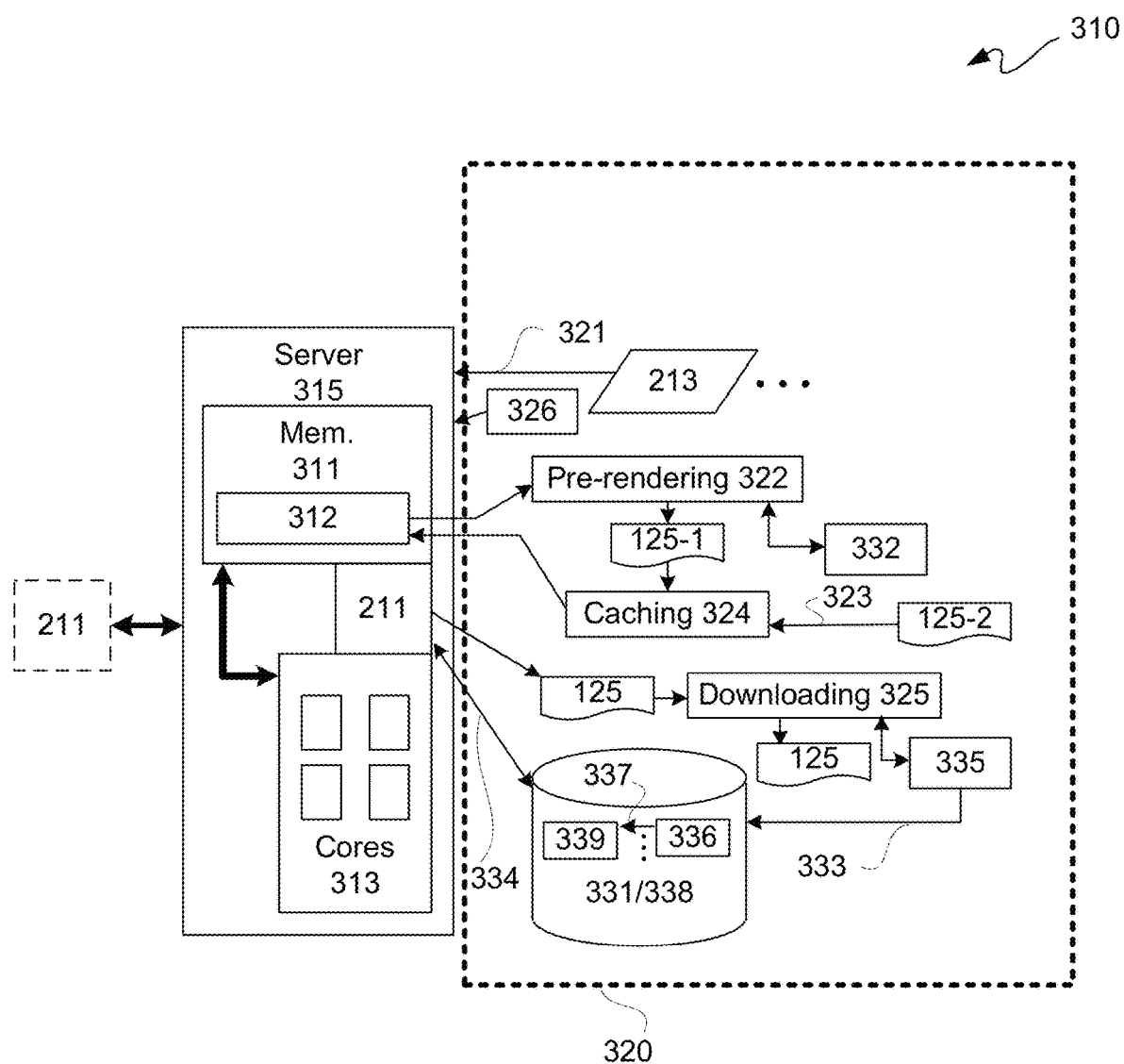
Figure 3:
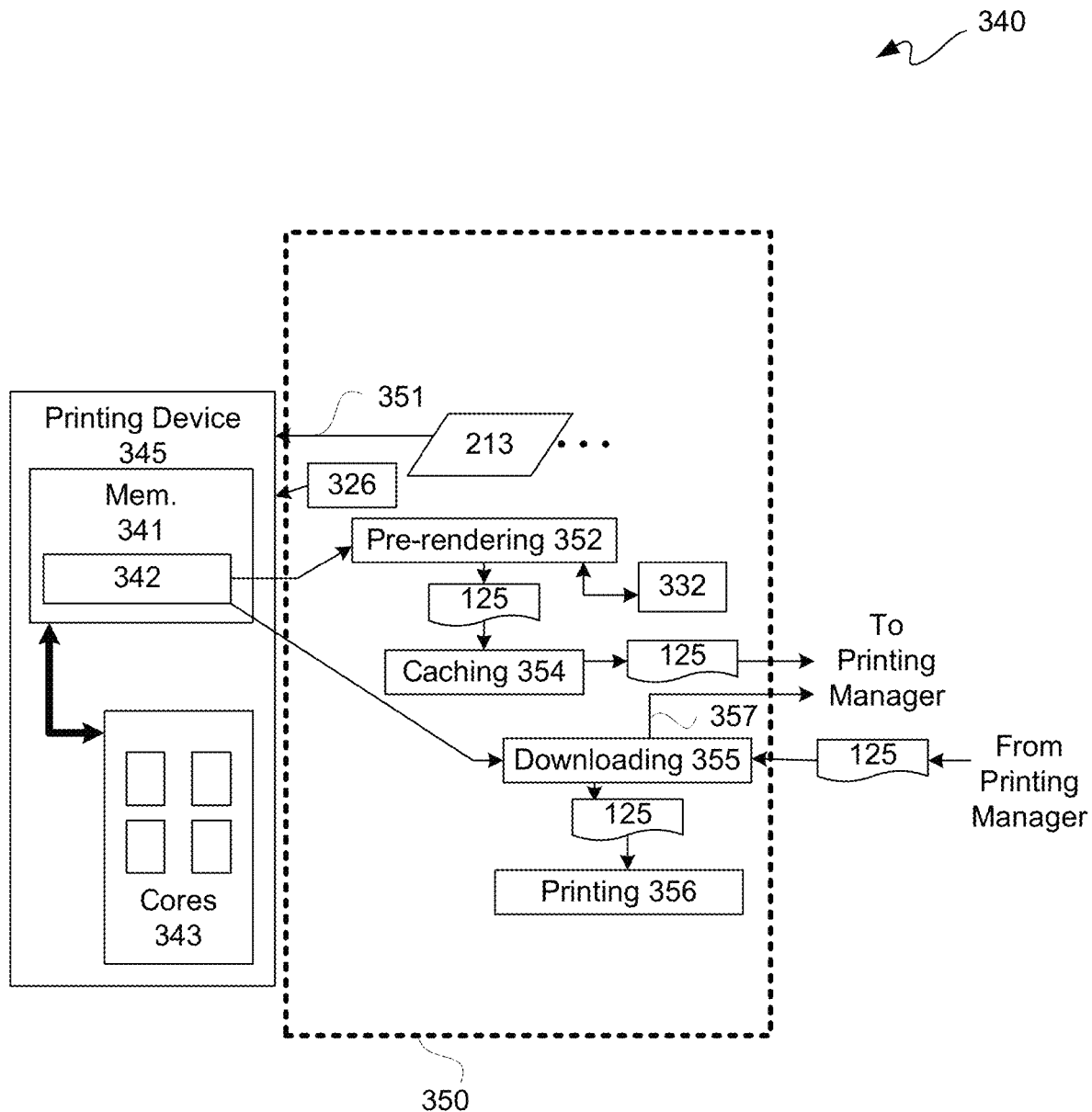

FIG. 5-1 is a flow diagram depicting an example of a tracking flow 410 for a printing manager to maintain a print history analysis. Tracking flow 410 is further described with simultaneous reference to FIGS. 1 through 5-1.

For a tracking flow 410, printing manager 210 may be configured to maintain a print history analysis. Printing manager 210 may keep track of documents that are frequently printed and keep a list with the most recently used and most frequently used documents at the top or front of such list. Such documents may be deemed candidates for pre-rendering in advance of print. Frequency of use or access may be tracked to determine a criteria or threshold amount of use or access for pre-rendering. Such candidates may be turned into corresponding pre-rendered document images and then be cached. Such cached pre-rendered document images may be made available for eventual printing.

For tracking of candidate documents for pre-rendering, a user may begin by performing a user-related action of user-related operations ("ops") 495, such as selecting or opening a document at operation 411. Such a selected document may be determined to be loaded, such as into an editing or other application, at operation 412 as part of user-related ops 495.

If such document is not loaded as determined at operation 412, then at operation 413 it may be determined whether such document is dropped through a print queue or printer driver as part of user-related ops 495. If such document is not dropped through a print queue or printer driver as determined at operation 413, then at operation 414 it may be determined whether such document is off line as part of user-related ops 495. If such document is determined to not be an offline file, then tracking flow 410 may end.

If any of operations 412 through 414 are answered in the affirmative, then document identifying information may be gathered at operation 415, and such gathered document identifying information may be sent to a printing manager 210 at operation 416 for updating of a document print history at operation 417. However, while operations 415 and 416 are performed in each of such affirmative instances, context changes in terms of where such operations are performed depending on where such document is obtained.

Along those lines, if a document is loaded at operation 412, then such a received document file may be for pre-rendering. At operation 415 of monitor app ops 496 of a monitor app 204 of an editing app 203 for example, identifying information about PRCS print job 213 and its associated document may be retrieved or gathered. At operation 416 of such monitor ops 496, such retrieved information may be sent as a set of data to printing manager 210 for checking and updating at operation 417 of printing manager ops 498, or initiating if not previously process, of such document's print history.

A PRCS print job 213 includes job parameters that identifies a job using a unique JobID for a context and includes a JobPathQRCode, which is an encoding of such document's name and its file path so that it can be located and identified. Associated print settings with such document may be tracked for knowing how such document is to be printed. This set of data may be used as criteria for identifying which documents are frequently accessed, opened, viewed, edited, and/or printed. This set of data may identify similarities and/or differences between printings of same or similar documents.

If a document is dropped through as determined at operation 412, then such a received document file may be for pre-rendering. At operation 415 of monitor printer driver ops 497 of a monitor app 206 of a printer driver 205 for example, identifying information about PRCS print job 213 and its associated document may be retrieved or gathered. At operation 416 of such monitor ops 497, such retrieved information may be sent as a set of data to printing manager 210 for checking and updating at operation 417 of printing manager ops 498, or initiating if not previously process, of such document's print history.

If a document is offline as determined at operation 414, then such a received document file may be for pre-rendering. At operation 415 of system service ops 418 of a PRCS services 231 for example, identifying information about PRCS print job 213 and its associated document may be retrieved or gathered. At operation 416 of such system service ops 418, such retrieved information may be sent as a set of data to printing manager 210 for checking and updating at operation 417 of system service ops 418, or initiating if not previously process, of such document's print history.

In a PRCS system as described herein, there may be two different types of pre-rendering, namely pre-rendering of active documents and pre-rendering of offline documents. A check at operation 414 is used to determine if a document is offline.

FIG. 5-2 is a flow diagram depicting an example of an active document pre-rendering flow 420. Active document pre-rendering flow 420 is further described with simultaneous reference to FIGS. 1 through 5-2.

Pre-rendering of active documents is related to the tracking of "idle times" in a document editing app, a print driver or a system service in host device. A user loads a document into an editing app 203 for example at operation 421 of user-related ops 495. Later, at operation 422 of user-related ops 495, a user opens a printer preference or print dialog for such a loaded document. At operation 423 of user-related ops 495, a user clicks or otherwise selects an okay or other command in a dialog or other window to assert a start printing command for such document. From these user-related ops 495, various other operations may be triggered.

At operation 424 of monitor app ops 496, a loaded document 424 may be detected in response to loading at operation 421. A PRCS plug-in in document editing app 203 may detect loading of s document and determines if such document can be pre-rendered. At operation 415 of monitor app ops 496, such PRCS plug-in gathers data identifying such document file, such as: a document file path, encoding it to an PRCSJobPathQRCode, and print settings from default or selected print driver.

At operation 426 of monitor app ops 496, a printing manager 210 may be queried for using information gather at operation 415. For example, a JobID for this current document, given data about such document file, may be used in such a query.

At operation 427 of printing manager ops 498, a printing manager 210 returns data that informs whether the current document has been previously rendered or not, such as whether a matching index for such current document is in cache 211 or not.

If printing manager 210 returns that such document is not in cache 211, then at operation 428 of monitor app ops 496, a PRCS plug-in interfaces with a default or selected printer driver to generate a PDL print job 213 in advance of printing and in background to generate a PRCS print job 213 with raw PDL data, which may be for all or a portion of such current document.

From operation 428 at operation 429 of monitor app ops 496, such generated PRCS print job 213 with raw PDL data may be sent to printing manager 210 or printer engine 229 for pre-rendering and caching. Timing of when to send such print job to printing manager 210 for pre-rendering may be controlled by a detection of idle time operation 430 of monitor app ops 496. Operation 430 may be used to gate when print jobs are sent to printing manager 210, so such print jobs are sent during an idle time and not otherwise.

In this example, such print job 213 is sent to printing manager 210 for determining whether a printing manager local RIP is present, as determined at operation 431 of printing manager ops 498. If a printing manager local RIP is present as determined at operation 431, then at operation 432 such document (or portion thereof) may be pre-rendered with raw PDL data at operation 432 and cached at operation 433 of printing manager ops 498.

If, however, no printing manager local RIP is present as determined at operation 431, then such document may be sent to printer engine 229 for pre-rendering with raw PDL data at operation 440 by such engine's RIP as part of printer engine ops 499. However, prior to going to press or printing, such pre-rendered document image for such document may be intercepted at operation 441 of printer engine ops 499 and sent to printing manager 210 for caching at operation 433.

If a document has been previously pre-rendered and is in cache 211 as determined at operation 427, then a no pre-rendering state for such document may exist. Thereafter, whenever there is an "idle time" during a user's session with respect to an open document editing app, detection of any changes for additional pre-rendering, namely a check for any change in contents of an open document, may be performed at operation 434 of monitor app ops 496 after a determination such a document has been previously pre-rendered as determined at operation 427.

If there is any change to page contents as determined at operation 434, a PRCS plug-in interfaces with a default or selected printer driver to generate a PDL print job 213 at operation 428 in advance of assertion of a print command and in the background to generate a PRCS print job 213 with raw PDL data for an affected page part, affected pages, or entire document. At operation 429, such PRCS print job 213 may be sent to printing manager 210 or printer engine 229 for pre-rendering, which may then be followed by caching of a pre-rendered document image associated therewith.

When a user opens printer preferences or print dialog at operation 422, at operation 434 a check may be performed to determine whether a change in one or more print settings has taken place. If there is any effect on page contents as determined at operation 434, a PRCS plug-in interfaces with a default or selected printer driver to a generate PDL print job at operation 428 in advance of assertion of a print command and in background to generate a PRCS print job 213 with raw PDL data for an affected page part, affected pages, or entire document. At operation 439, such generated PRCS print job 213 with raw PDL data may be sent to printing manager 210 or printer engine 229 for pre-rendering, which may be followed by caching of a pre-rendered document image associated therewith.

If there is no change or affect to contents as determined at operation 434, then a wait state 457 may be entered. In wait state 457, active document pre-rendering flow 420 may wait for a user action.

When user clicks "OK" or other selection at operation 423 to assert a print command to start a printing process. In response to assertion of a print command, a PRCS service in a printer driver or system service creates or generates a PRCS signal print job 213 at operation 438 of monitor printer driver ops 497. Such signal print job 213 may be generated with the set of data identifying a current document, such as gathered at operation 415.

At operation 439 of monitor printer driver ops 497, such PRCS signal print job 213 may be sent to printing manager 210 or printer engine 229 for retrieval and printing of an associated previously pre-rendered document image that was sent in advance of assertion of such current printing command and was pre-rendered in background in advance of assertion of such current printing command.

In this example, such a signal print job 213 is sent to printing manager 210 to query or check cache at operation 435 of printing manager ops 498 for one or more pre-rendered document images associated with a current document to be printed. If no pre-rendered document image associated with a current document is found in cache as determined at operation 435, then at operation 442 of printer engine ops 499 an optional error message may be displayed on a printer display and/or an error page may be printed. Optionally, at operation 443 of printer engine ops 499 a notification may be sent to a PRCS monitor app 204 or 206 to regenerate a PRCS print job 213 with raw PDL data. In this example, such notification sent at operation 443 is provided to PRCS monitor app 204.

In embodiments, changes in parts of a page, such as when a PRCS feature is integrated into a document editing app, may be detected. When only certain parts of a page are changed, a PRCS feature can interface with a printer driver to generate PDL data for each affected part of a page, and create a PRCS print job with raw PDL data to render such page with such modified parts thereof. As such affected page may be a subset of an entire document, a pre-rendered document image to be generated for such subset print job may be combined with a previously pre-rendered document image that is for the entire document.

If at operation 435 such one or more pre-rendered document images are found in cache, then at operation 436 of printer engine ops 499 such all such pre-rendered document images found may be retrieved, and if more than one, such retrieved images may be combined into one image. At operation 437 of printer engine ops 499, a resulting pre-rendered document image from operation 436 may be sent to a video component for printing; after printing, active document pre-rendering flow 420 may end or return.

FIG. 5-3 is a flow diagram depicting an example of an offline document pre-rendering flow 450. Offline document pre-rendering flow 450 is further described with simultaneous reference to FIGS. 1 through 5-3.

Documents deemed candidates for printing may be pre-rendered in advance of asserting a print command, which may include in background, when a user is not actively modifying those documents. Along those lines, at operation 451 of user-related ops 495, a user may select a document file to print. At operation 452 of user-related ops 495, a user may drop such a document file on a print queue or printer driver or like operation at a host device to cause a print job to be initiated.

When performing a drag-drop of an offline document onto a print queue or printer driver to spool such a document, conventionally an associated application is called, and such document is re-processed through a printer driver to create a print job for transmission to a printer. In contrast to conventional printer drover post drag-drop processing, a print monitor supports PRCS, such as monitor apps 204 or 206, skip re-processing a dropped document through an associated application, such as an editing app 203 for example, or through an associated printer driver. Instead, a gathering or retrieving of identity information operation 415 may be performed as a monitor app operation of monitor apps 496 or 497.

This gathering operation may include print settings in association with a default or selected printer driver in addition to document identifying information. Such a gathering operation 415 may include obtaining a document file path and encoding it to a PRCSJobPathQRCode. Moreover, gathering or retrieving operation 415 may include obtaining print settings from a print driver 205.

With such gathered information, a query printing manager operation 426 may be performed as a monitor app operation of monitor apps 496 or 497 using a job identifier for a currently selected document, which may additionally use other document identifying information as one or more vectors.

At operation 427, a check with printing manager 210, or optionally a PRCS component with a print monitor or a printer driver, may be performed to determine if such a document has been previously pre-rendered. Printing manager 210 may return data that informs a monitor app 204 or 206 whether an offline document has been previously rendered or not. Optionally, operation 427 may include a check in cache 211 for a pre-rendered document image 125 of such an offline document.

In an example, if a pre-rendered document image 125 is found for such an offline document, has been previously pre-rendered and it is in printing manager cache 211, printing manager 210, or optionally a PRCS component, may retrieve such pre-rendered document image from printing manager 210 cache and "push" or download it to a printer for printing. A printer engine 229 component at such a printer may receive such a pre-rendered document image and print it.

In another example, printing manager 210 may retrieve a JobID and optionally other identifying information like PRCS_JobPathQRCode for such an offline document and send an PRCS signal print job to a printer engine 229 at a printer. Printer engine 229 may be configured to detect that such an offline document is ready for printing, and because it was deemed to have been pre-rendered, printer engine 229 may retrieve or do "pull" printing of such pre-rendered document image 125 from printing manager 210 cache and print it.

In yet another embodiment, a printer driver, an application plug-in or a system service can send a PRCS signal print job to a printer engine 229, which, in turn, can "pull" print to get an associated pre-rendered document image 125 from printing manager 210 cache to print it.

If document has been previously pre-rendered and is found in cache 211, a PRCS service in a printer driver, a print monitor, or a system service may generate a PRCS signal print job with a set of data identifying such an offline document. In this example, if at operation a pre-rendered document image 125 is found in cache 211 for a currently processed offline document, a signal print job 213 may be generated at operation 438 of monitor app ops 496 or monitor printer driver ops 497.

In this example, at operation 439, a monitor app 204 or 206 may send such a signal print job to a check cache operation 435. However, this check of cache 211 is a printer engine ops 399 operation of a printer engine 229. In brief, a PRCS signal print job 213 is sent to printer engine 229 for retrieval and printing of pre-rendered document image. From cache operation 435 either operations 442 and 443 or 436 and 437 may be performed, as previously described.

Pre-rendering can be performed with printer engine 229; however, in another example, pre-rendering can be performed at a printing manager 210, where such printing manager 210 may be in an external device, a server, a desktop computer, a portable computing device (e.g., a Raspberry Pi, a minicomputer, or the like), or at host computer that has support for PRCS. In an example, printing manager 210 may include an integrated RIP software to perform pre-rendering.

If a pre-rendered version of an offline document is not found at operation 427, such as in printing manager 210 cache for example, a PRCS monitor app 204 or 206 at a host device may interface with a printer driver to generate an PRCS print job 213 with raw PDL data at operation 428 of monitor app ops 496 or monitor printer driver ops 497. A generated PRCS print job 213 with raw PDL data may then be sent to printing manager 210 for pre-rendering, as previously described with reference to operations 428, 429, 431-433, 440, and 441, where operations 428 and 429 are of monitor app ops 496 or monitor printer driver ops 497. Such a PRCS print job 213 may be treated like a regular PDL print job, except this PDL print job 213 includes PRCS job parameters that identify it as print job for pre-rendering and eventual caching of a resulting generated pre-rendered document image.

FIG. 5-4 is a flow diagram depicting an example of a print job handling flow ("handling flow") 480. Handling flow 480 may be for a PRCS print job 213 with raw PDL, such as for example by or including use of a printing manager 210. Handling flow 480 is further described with simultaneous reference to FIGS. 1 through 5-4.

At operation 481 of printing manager ops 498, a PRCS print job 213 with raw PDL data may be received. At operation 482 of printing manager ops 498, a check for a PRCS mode setting status may be performed.

If a PRCS Mode is set to OFF as determined at operation 482, a relay print job to a printer for immediate regular processing at operation 483 of printer engine ops 499, such as processing through RIP firmware, may be performed. This is a pass-through print job.

If a PRCS Mode job parameter is set to ON as determined at operation 482, such a document is to be pre-rendered. A check at operation 431 of printing manager ops 498 may be made to determine whether a printing manager local RIP is present, such as built within such a printing manager 210. If a printing manager 210 has integrated RIP support, a pre-rendering operation 432 may be performed at printing manager 210. Printing manager 210 may process a PRCS print job 213 with raw PDL data through such integrated RIP software. This may generate a pre-rendered document image 125 at a printing manager 210 location.

At operation 485 of printing manager ops 498, a check may be performed to determine whether a PRCS cache action job parameter is set to ON. If such a cache action job parameter is set to ON, printing manager 210 may store in cache 211 such a generated pre-rendered document image.

Generally, for this example, it is not expected that a PRCS Cache Action job parameter may be set to OFF when received at printing manager 210, as there is no use-case for this combination with mode set to ON for printing manager 210. However, if this unexpected combination is received, a pre-rendered document image may be relayed to printer engine 229 for immediate printing, namely set to a video component at operation 437 of printer engine ops 499.

If printing manager 210 has no integrated RIP, such as RIP software for example, as determined at 431, a current PRCS print job 213 with raw PDL data may be relayed to printer engine 229 for pre-rendering operation 440. Printer engine 229 may detect that this print job contains raw PDL data and it may perform pre-rendering through an RIP, such as RIP firmware for example. At operation 441, printer engine 229 may intercept a generated pre-rendered document image.

A check operation 484 of printer engine ops 499 may be used to determine whether a PRCS cache action is set to ON. Depending on a value of a PRCS cache action job parameter, printer engine 229 may either: upload a generated pre-rendered document image back to printing manager 210 for caching at operation 433 if an associated PRCS cache Action flag is set to OFF; or immediately print a generated pre-rendered document image through a video component at operation 437 at printer engine 229 if an associated PRCS cache action flag is set to OFF (which is not an expected combination of settings with PRCS Mode ON in this example).

A printing manager 210 may include an integrated caching system that may maintain and manage all pre-rendered document images for a PRCS system. Such caching may be embedded document image caching or external document image caching.

For embedded document caching in a printer engine 229, a document image caching operator may be embedded inside such printer engine. An embedded document caching operator 261, such as embedded in PRCS engine 216 or generally embedded in printer engine 229, may be configured to store pre-rendered document images 125, which were created from PRCS print jobs 213 with raw PDL data. Such pre-rendered document images 125 may be cached in optional cache 260 or otherwise kept in printer 220 for access by printer engine 229 in preparation for actual printing onto a print medium, such as plastic, paper, or other material.

Document image caching operator 261 in printer engine 229 waits for a PRCS signal print job 213 to start actual printing onto a print medium. When a user elects to print a document, such as by clicking on an "OK" button in any of multiple print dialogs, or when a user sends an offline document for printing to a printer, document image caching operator 261 may search and retrieve a pre-rendered document image associated to a received document. This user action may signal to start actual printing onto paper for example. A retrieved pre-rendered document image, such as retrieved from cache 260 by operator 261, may be sent to a video component of printer 220 for final processing and actual rendering onto paper.

Optionally, a document image caching operator 261 may be external with respect to a printer 220. In this example, pre-rendered document images could be cached in an independent and portable device that is external or outside of printer 220. For example, caching operator 261 may be in a host device of a printing manager 210, such as a standalone device like a server, desktop computer, laptop or other portable computing device, and caching operator 261 is configured to support for caching of pre-rendered document images in such host device. In this configuration, caching operator would not compete for resources like memory and CPU time in a printer 220.

As previously described there are multiple forms of processes used with cache 211 any, some or all of which may be configured into printing manager 210. Printing manager 210 may be configured to: check if a document has been previously cached; cache incoming pre-rendered document images; and/or retrieve pre-rendered document images.

FIG. 5-5 is a flow diagram depicting an example of a cache checking flow 490. Cache checking flow 490 may be used to determine whether a document has been previously cached, as described elsewhere herein. In this example, all operations of cache checking flow 490 are printing manager ops 498 of printing manager 210. Cache checking flow 490 is further described with simultaneous reference to FIGS. 1 through 5-5.

A PRCS query operator in a printer driver, such as in monitor app 206, or an application plug-in, such as in monitor app 204, or in a printing manager 210 or a printer engine 229, may send a query into a printing manager 210 caching system to check if a document has a cached pre-rendered document image, such as in cache 211. At operation 491, a query to check if a document has been previously pre-rendered and cached may be received by printing manager 210. At operation 492, document identifying data from such query may be parsed, such as into respective job parameters. Such document identifying data may include: a PRCS_JobPathQRCode, a document JobID, print settings, and/or other identifying information.

At operation 493, a search of a cache database, a file system or a combination of a database and a file system for at least one entry for prior pre-rendering of a document may be performed. At operation 494, a status of whether such a document has been previously pre-rendered or not may be returned to a PRCS query operator initiation such query received at operation 491.

Figures 1, 5:
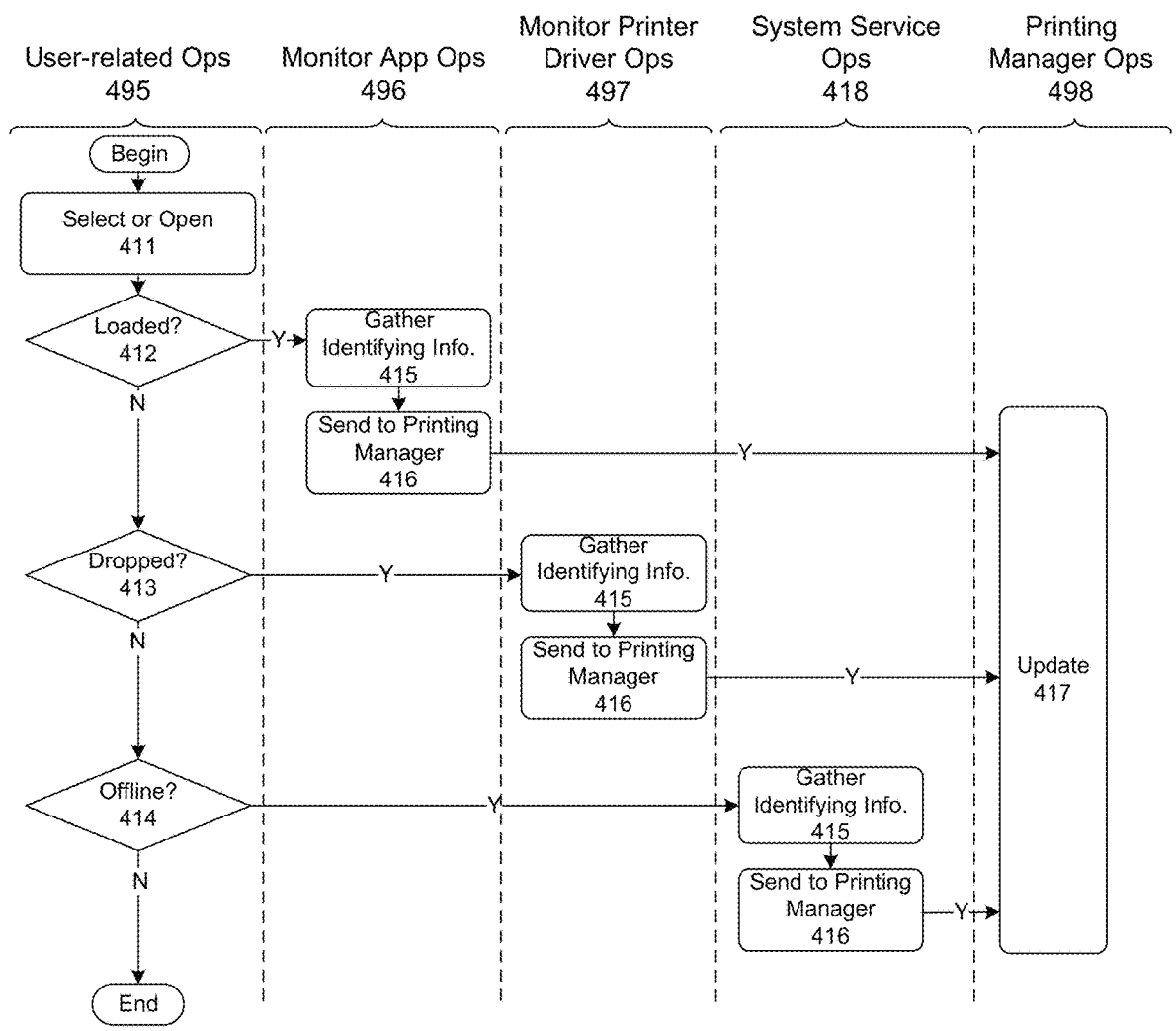
Figures 2, 5:
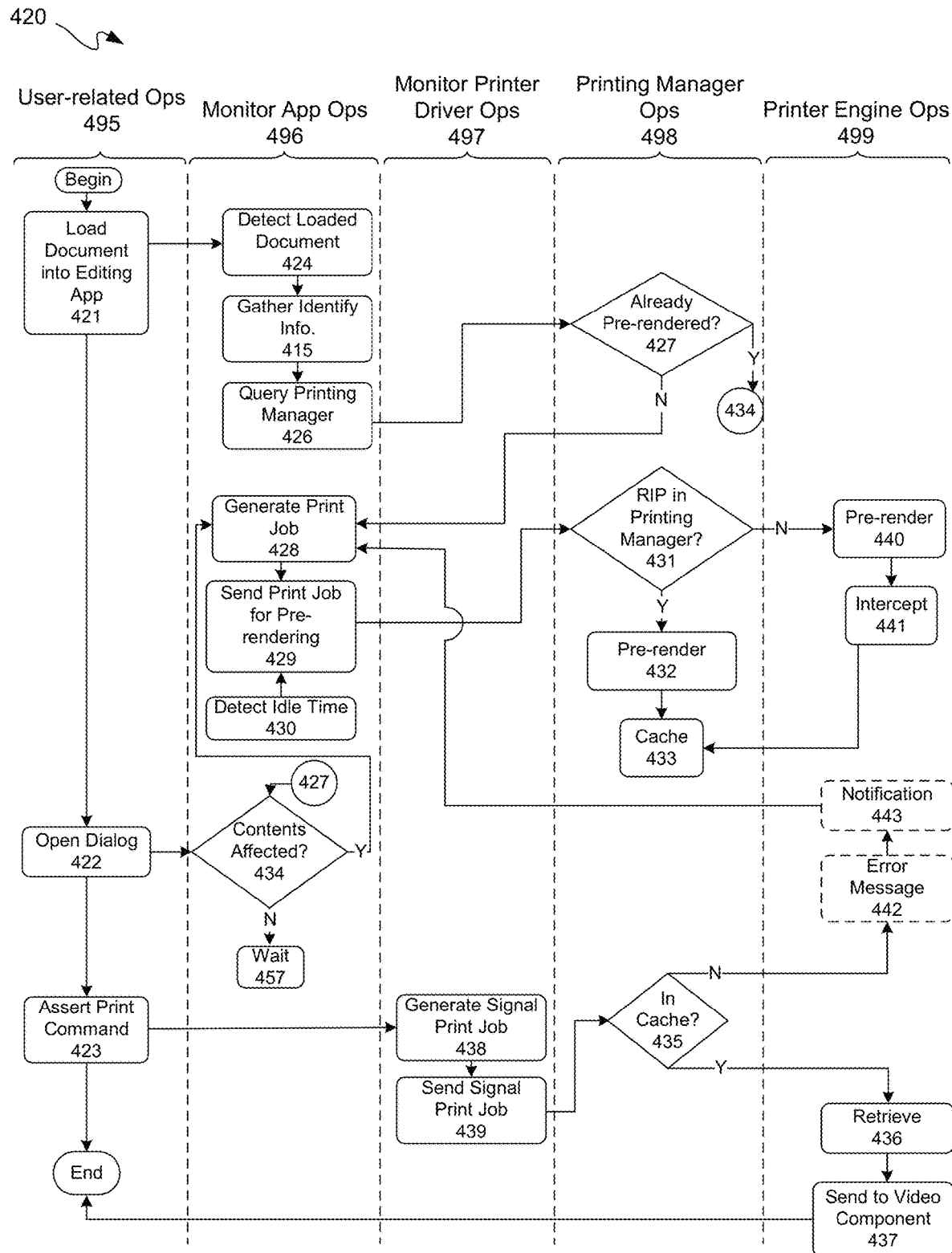
Figures 3, 5:
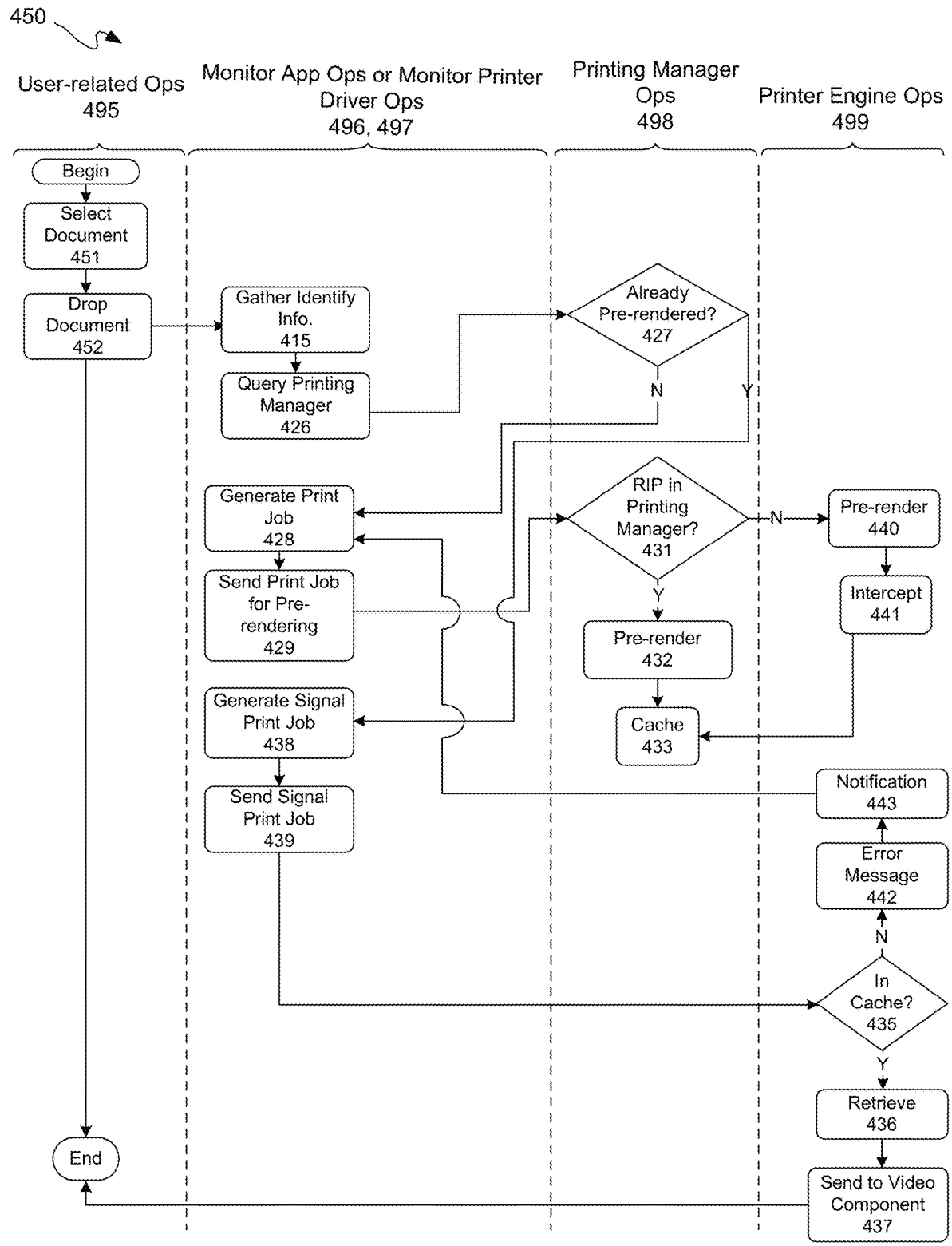
Figures 5, 6:
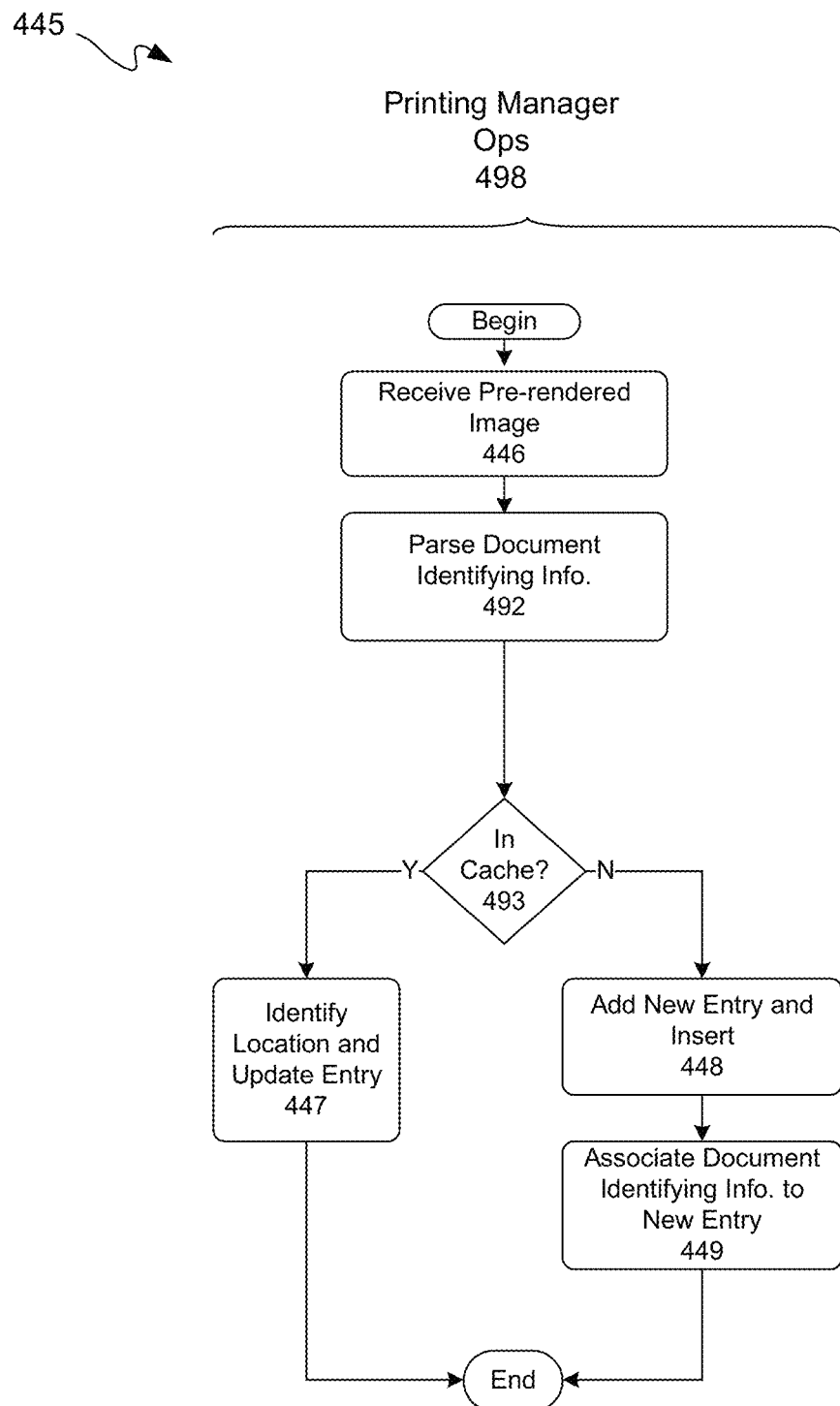

FIG. 5-6 is a flow diagram depicting an example of a caching flow 445. Caching flow 445 may be used for caching of incoming pre-rendered document images 125, as described elsewhere herein. In this example, all operations of caching flow 445 are printing manager ops 498 of printing manager 210. Caching flow 445 is further described with simultaneous reference to FIGS. 1 through 5-6.

At operation 446, printing manager 210 may receive a pre-rendered document image 125 as a print job 213 from: printer engine 229; printing manager 210 in a host device, namely when such host device has integrated PRCS pre-rendering support; or printing manager 210 itself at as a standalone device when printing manager 210 has an integrated RIP, such as software and/or hardware. This print job may be designated as PRCS print job 213 with a pre-rendered document image 125 or more simply may be a pre-rendered document image 125.

At operation 492, printing manager 210 may gather and parse information received in print job, such as parsing print job parameters or other document identifying information. Such document identifying information parsed may include: a PRCS_JobPathQRCode; a document JobID; print settings; and/or other identifying information.

At operation 493, a cache database may be searched for a pre-rendered document image associated with such identified document using such document identifying information.

If a prior entry for such document is found at operation 493, then at operation 447 a location in cache of such prior entry may be identified and updated. Such found prior entry may be updated with a current or "new" pre-rendered document image 125 received at operation 446.

If a prior entry for such document is not found at operation 493, then at operation 448 a new entry for such a received pre-rendered document image may be added in a cache database, and such received pre-rendered document image may be added to cache 211. At operation 449, such database entry added may be populated with or otherwise indexed to associated document identifying information for such pre-rendered document image.

Figures 5, 6, 7:
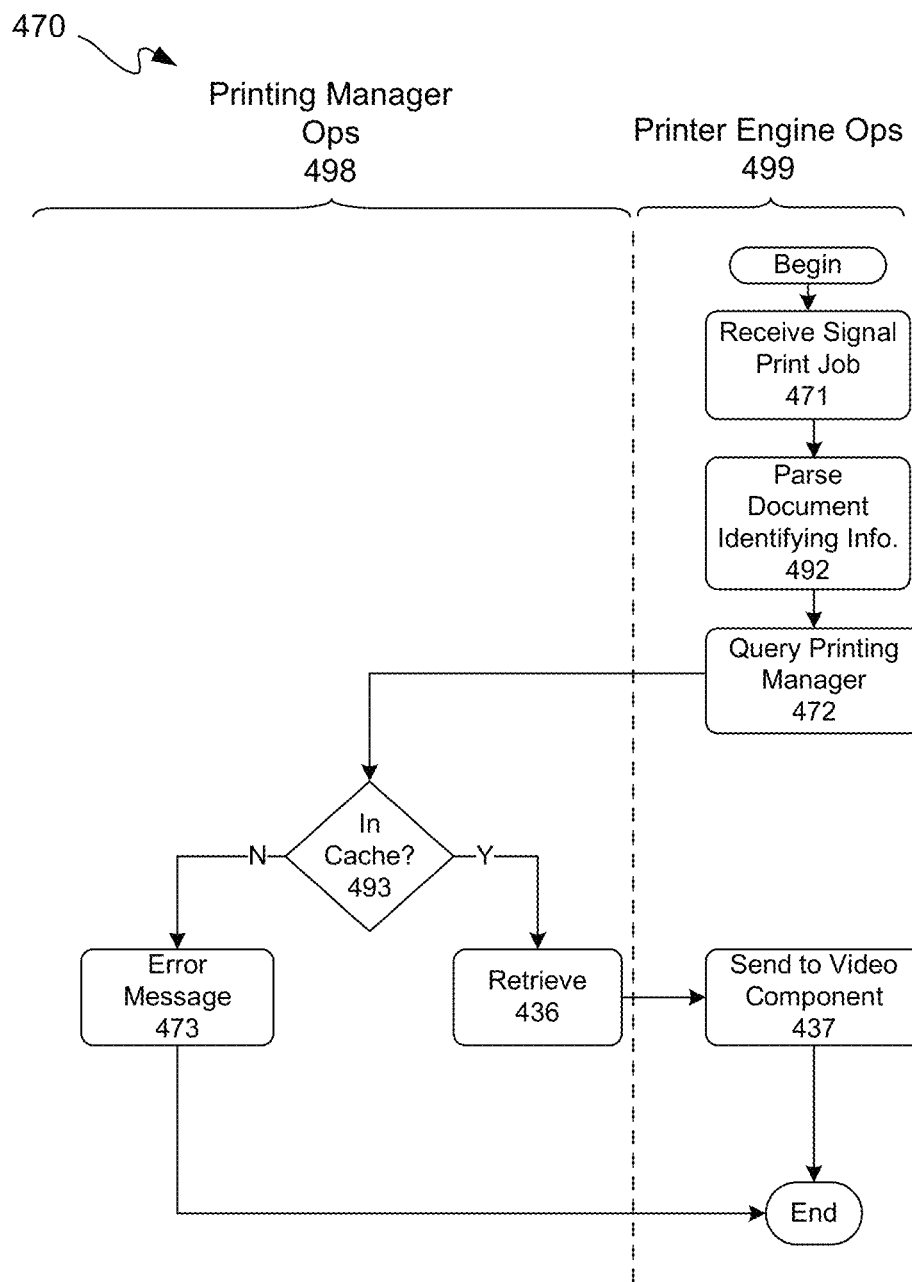
Figures 1, 6:
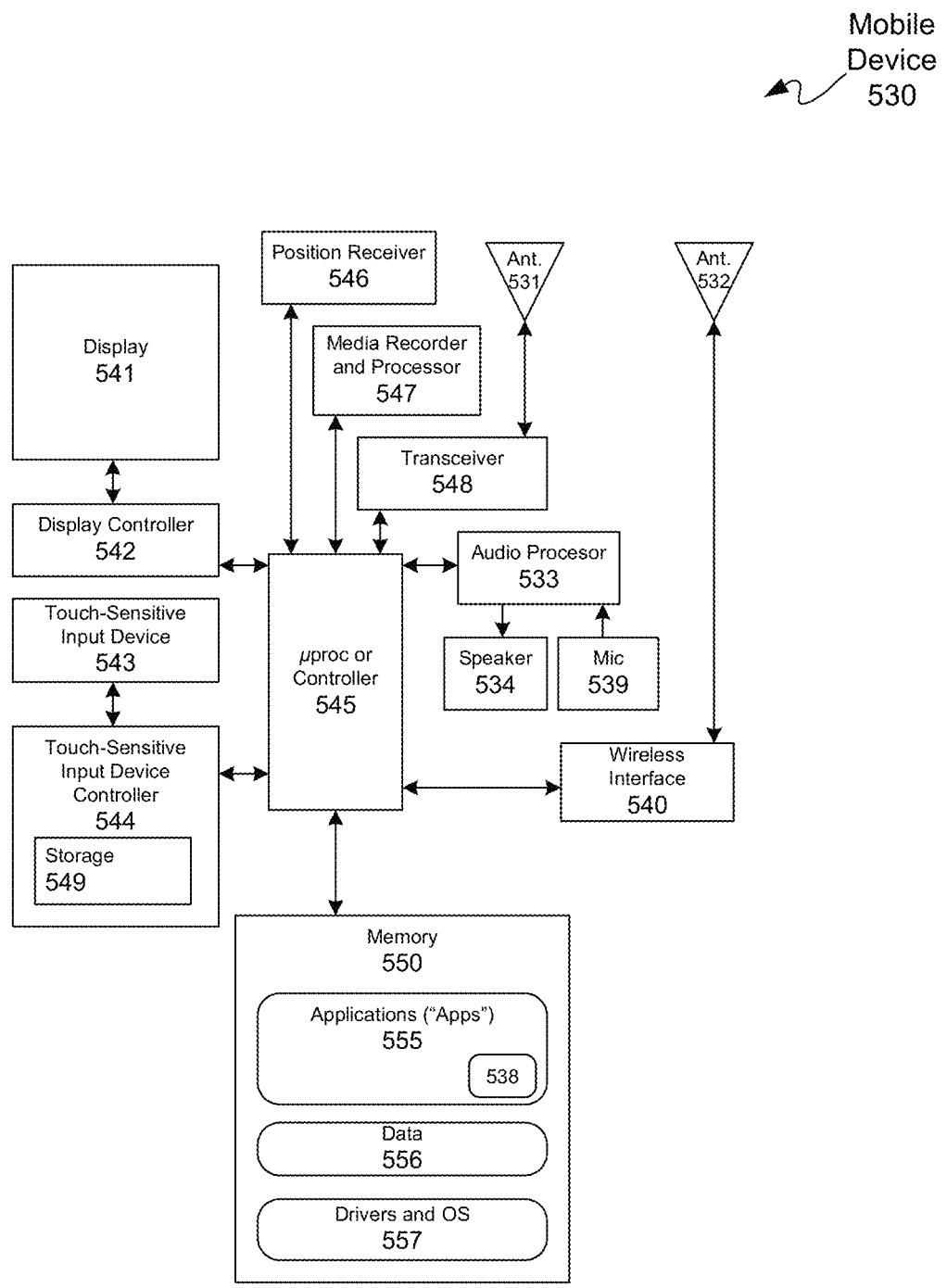
Figures 2, 6:
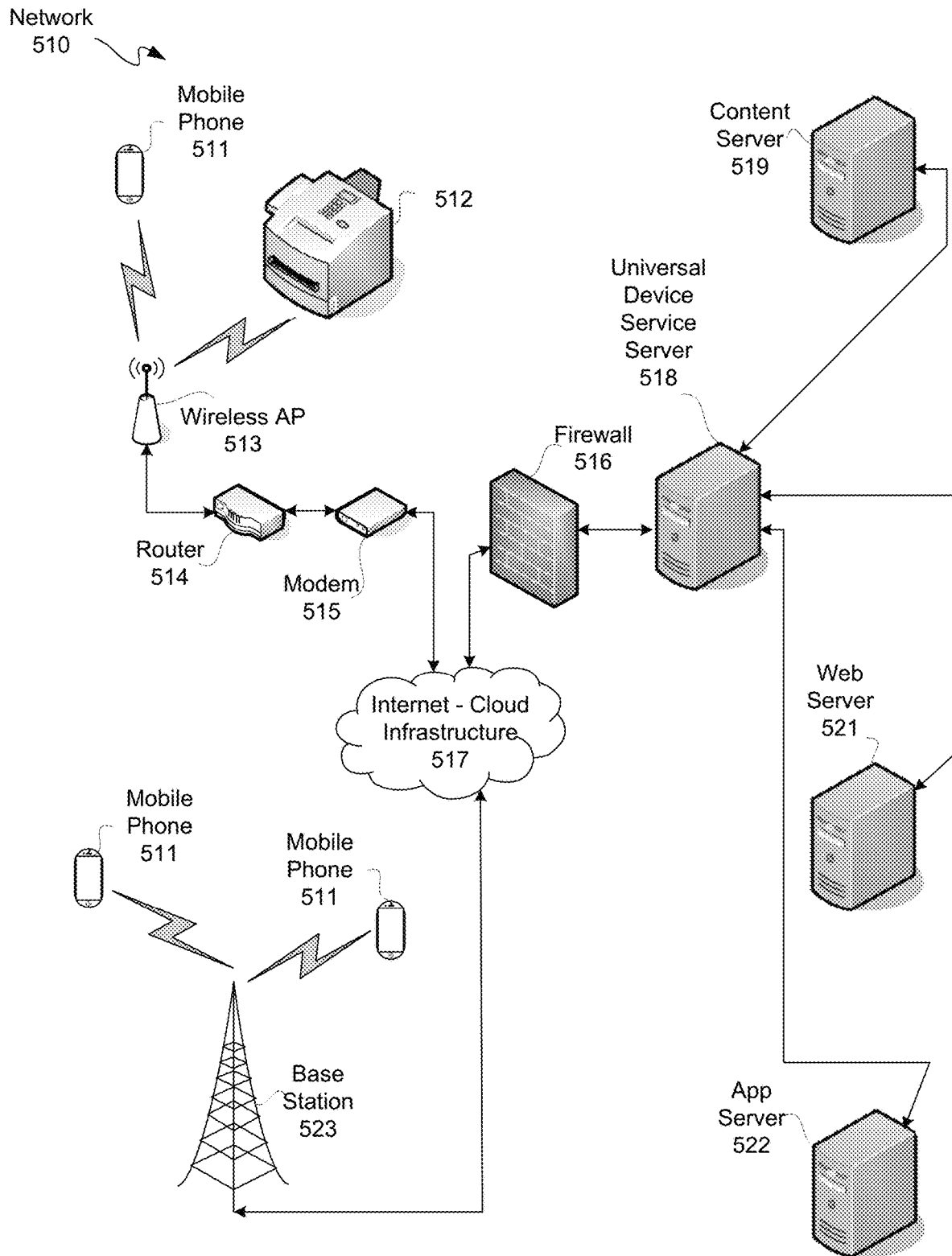
Figures 3, 6:
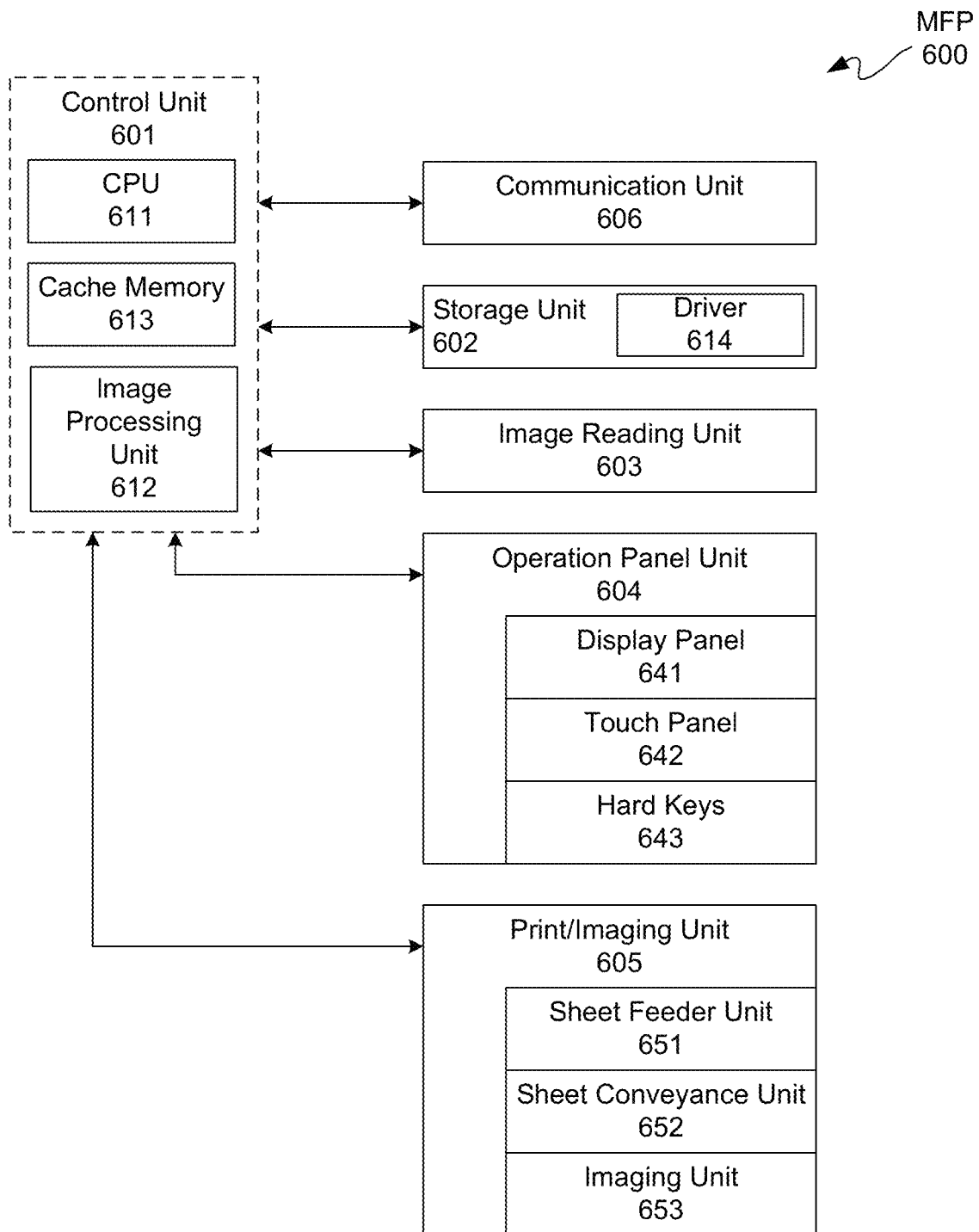
Figure 7:
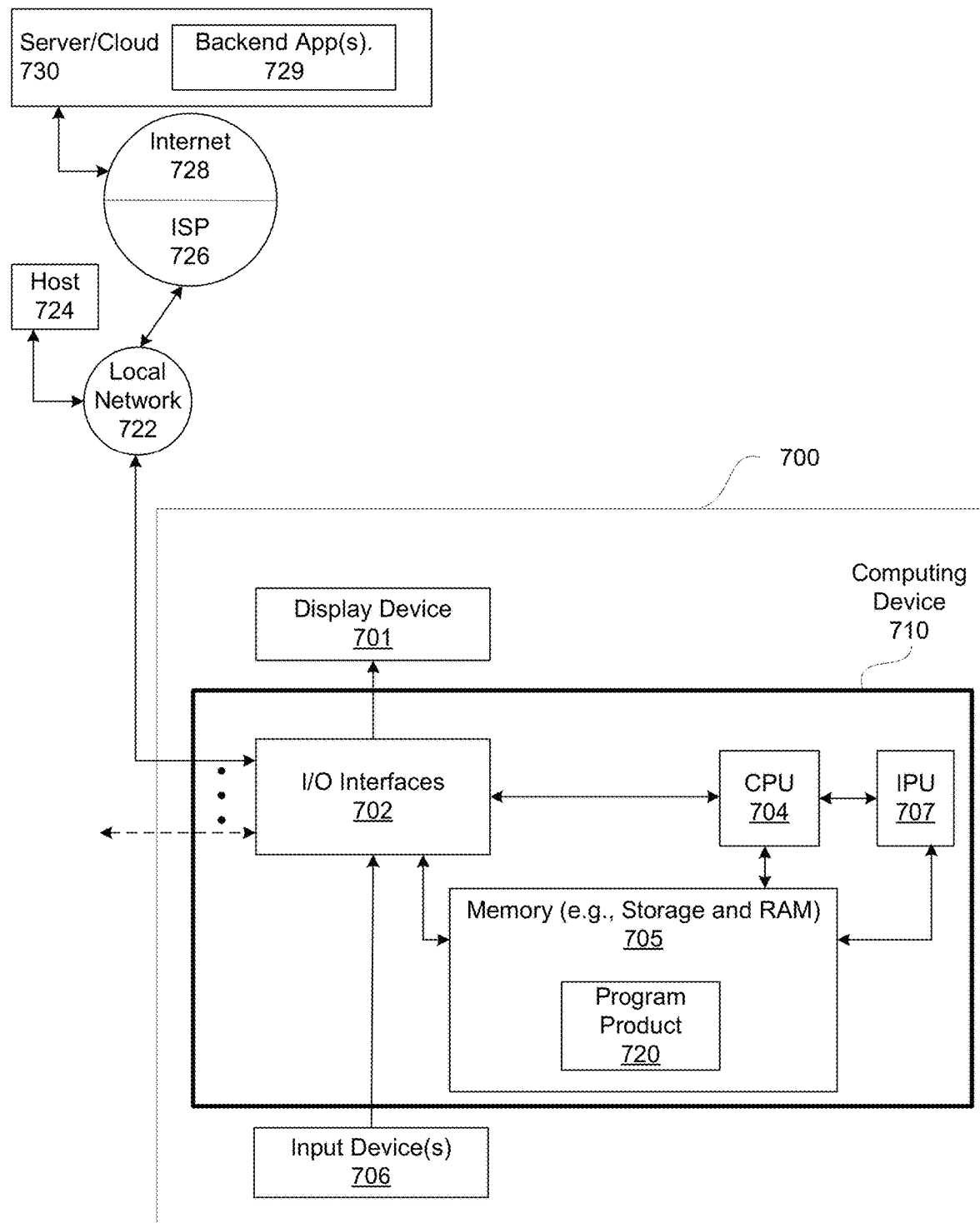

FIG. 5-7 is a flow diagram depicting an example of a cache retrieval flow 470. Cache retrieval flow 470 may be used for retrieval of pre-rendered document images for printing. Cache retrieval flow 470 is further described with simultaneous reference to FIGS. 1 through 5-7.

When a document is to be printed, such as at the time when a PRCS Signal print job 213 is received, a pre-rendered document image 125 may be retrieved from printing manager 210 cache and prepared and sent to printer engine 229 for printing onto a print medium. A signal to retrieve a pre-rendered document image 125 may be received at printer engine 229 or at printing manager 210.

For purposes of clarity by way of example and not limitation, cache retrieval flow 470 is for PRCS signal print job 213 received at printer engine 229. However, receipt of a signal for a print job directly by printing manager 210 follows from the following description.

At operation 471 of printer engine ops 499, a PRCS signal print job 213 is receive by printer 220, or more particularly at printer engine 229 in printer 220. At operation 492 of printer engine ops 499, document identifying information of such signal print job 213 may be gathered and parsed, as previously described.

At operation 472 of printer engine ops 499, a printing manager 210 may be queried to determine if a document associated with such signal print job 213 has been previously pre-rendered. Such a query may use parsed document identifying information in order to form a structured query.

At operation 493 of printing manager ops 498, a search of a cache database for a pre-rendered document image for an identified document may be performed using such query. If such a pre-rendered document image is found in printing manager 210 cache database, such pre-rendered document image may be retrieved from cache 211 in response at operation 436 of printing manager ops 498. Such retrieved pre-rendered document image may be sent to printer engine 229 for sending to a video component thereof at operation 437 of printer engine ops 499. Such pre-rendered document image may thereafter be rendered using such video component to print or otherwise impart same onto a print medium.

If, at operation 493, a search of a cache database by printing manager 210 does not find an entry for such pre-rendered document image in cache, an error message may be sent at operation 473 of printing manager ops 498. Such error message may be sent as a signal failure to a sender of an associated PRCS signal print job 213 received at operation 471.

If a document is an offline file and not coming as part of a print job from a print driver (using PRCS_JobPathQRCode information and other identifying information in job parameters), such offline document file may be re-processing through a printer driver 205 and then an RIP for re-rendering and subsequent re-caching.

For a sender of PRCS signal print job 213, such sender may either: re-send a "new" PRCS print job 213 with raw PDL data to re-process such document for re-pre-rendering and re-caching; or issue an error message to a user and/or print an error page.

Because one or more of the examples described herein may be implemented in using a network, such as for a cloud-based SaaS and/or PaaS implementation, or a computing/printing device system, as well as a mobile device and a printing device, a detailed description of examples of each is provided. However, it should be understood that other configurations of one or more of these examples may benefit from the technology described herein.

FIG. 6-1 is a block diagram depicting an example of a portable communication device ("mobile device") 530. Mobile device 530 may be an example of a mobile device, as described elsewhere herein.

Mobile device 530 may include a wireless interface 540, an antenna 531, an antenna 532, an audio processor 533, a speaker 534, and a microphone ("mic") 539, a display 541, a display controller 542, a touch-sensitive input device 543, a touch-sensitive input device controller 544, a microprocessor or microcontroller 545, a position receiver 546, a media recorder-processor 547, a cell transceiver 548, and a memory or memories ("memory") 550.

Microprocessor or microcontroller 545 may be programmed to control overall operation of mobile device 530. Microprocessor or microcontroller 545 may include a commercially available or custom microprocessor or microcontroller.

Memory 550 may be interconnected for communication with microprocessor or microcontroller 545 for storing programs and data used by mobile device 530. Memory 550 generally represents an overall hierarchy of memory devices containing software and data used to implement functions of mobile device 530. Data and programs or apps as described hereinabove may be stored in memory 550.

Memory 550 may include, for example, RAM or other volatile solid-state memory, flash or other non-volatile solid-state memory, a magnetic storage medium such as a hard disk drive, a removable storage media, or other suitable storage means. In addition to handling voice communications, mobile device 530 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 550 stores drivers, such as I/O device drivers, and operating system programs ("OS") 557. Memory 550 stores application programs ("apps") 555 and data 556. Data may include application program data. One or more apps 538 as described herein may be stored with apps 555.

I/O device drivers may include software routines accessed through microprocessor or microcontroller 545 or by an OS stored in memory 550. Apps, to communicate with devices such as the touch-sensitive input device 543 and keys and other user interface objects adaptively displayed on a display 541, may use one or more of such drivers.

Mobile device 530, such as a mobile or cell phone, includes a display 541. Display 541 may be operatively coupled to and controlled by a display controller 542, which may be a suitable microcontroller or microprocessor programmed with a driver for operating display 541.

Touch-sensitive input device 543 may be operatively coupled to and controlled by a touch-sensitive input device controller 544, which may be a suitable microcontroller or microprocessor. Along those lines, touching activity input via touch-sensitive input device 543 may be communicated to touch-sensitive input device controller 544. Touch-sensitive input device controller 544 may optionally include local storage 549.

Touch-sensitive input device controller 544 may be programmed with a driver or application program interface ("API") for apps 555. An app may be associated with a service, as previously described herein, for use of a SaaS for example. One or more aspects of above-described apps may operate in a foreground or background mode.

Microprocessor or microcontroller 545 may be programmed to interface directly with touch-sensitive input device 543 or through touch-sensitive input device controller 544. Microprocessor or microcontroller 545 may be programmed or otherwise configured to interface with one or more other interface device(s) of mobile device 530. Microprocessor or microcontroller 545 may be interconnected for interfacing with a transmitter/receiver ("transceiver") 548, audio processing circuitry, such as an audio processor 533, and a position receiver 546, such as a global positioning system ("GPS") receiver. An antenna 531 may be coupled to transceiver 548 for bi-directional communication, such as cellular and/or satellite communication.

Mobile device 530 may include a media recorder-processor 547, such as a still camera, a video camera, an audio recorder, or the like, to capture digital pictures, audio and/or video. Microprocessor or microcontroller 545 may be interconnected for interfacing with media recorder-processor 547. Image, audio and/or video files corresponding to the pictures, songs and/or video may be stored in memory 550 as data 566.

Mobile device 530 may include an audio processor 533 for processing audio signals, such as for example audio information transmitted by and received from transceiver 548. Microprocessor or microcontroller 545 may be interconnected for interfacing with audio processor 533. Coupled to audio processor 533 may be one or more speakers 534 and one or more microphones 539, for projecting and receiving sound, including without limitation recording sound, via mobile device 530. Audio data may be passed to audio processor 533 for playback. Audio data may include, for example, audio data from an audio file stored in memory 550 as data 556 and retrieved by microprocessor or microcontroller 545. Audio processor 533 may include buffers, decoders, amplifiers and the like.

Mobile device 530 may include one or more local wireless interfaces 540, such as a WiFi interface, an infrared transceiver, and/or an RF adapter. Wireless interface 540 may provide a Bluetooth adapter, a WLAN adapter, an Ultra-Wideband ("UWB") adapter, and/or the like. Wireless interface 540 may be interconnected to an antenna 532 for communication. As is known, a wireless interface 540 may be used with an accessory, such as for example a hands-free adapter and/or a headset. For example, audible output sound corresponding to audio data may be transferred from mobile device 530 to an adapter, another mobile radio terminal, a computer, or another electronic device. In another example, wireless interface 540 may be for communication within a cellular network or another Wireless Wide-Area Network (WWAN).

FIG. 6-2 is a pictorial diagram depicting an example of a network 510, which may be used to with an SaaS and/or PaaS platform for hosting a service or micro service for use by a user device, as described herein. Along those lines, network 510 may include one or more mobile phones, pads, desktops, notebooks, and/or other web-usable devices 511 in wired and/or wireless communication with a wired and/or wireless access point ("AP") 513 connected to or of a wireless router 514. Furthermore, one or more of such web-usable wireless devices 511 may be in wireless communication with a base station 523. Additionally, a printing device 512 may be web-usable and may be in wireless and/or wired communication to and from router 514.

Wireless AP 513 may be connected for communication with a router 514, which in turn may be connected to a modem 515. Modem 515 and base station 523 may be in communication with an Internet-Cloud infrastructure 517, which may include public and/or private networks.

A firewall 516 may be in communication with such an Internet-Cloud infrastructure 517. Firewall 516 may be in communication with a universal device service server 518. Universal device service server 518 may be in communication with a content server 519, a web server 524, and/or an app server 522. App server 522, as well as a network 510, may be used for downloading an app or one or more components thereof for accessing and using a service or a micro service as described herein.

FIG. 6-3 is a block diagram depicting an example of a printing device 600 upon which one or more aspects described herein may be implemented. In this example, a printing device 600 is a multi-function printer (MFP) 600. However, in another example, another type of printing device 600 may be used, such as for example a standalone printer. MFP 600 is provided for purposes of clarity by way of non-limiting example.

MFP 600 in this example includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. In another example, control unit 601 may be separate from MFP 600.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

FIG. 7 is a block diagram depicting an example of a computing/printing device system ("system") 700 upon which one or more aspects described herein may be implemented. System 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. System 700 by itself or networked with one or more other such systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image/a graphics processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

System 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic and/or optical signals that carry analog and/or digital data streams. Data carrying signals through various networks, which carry data to and from system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

System 700 can send messages and receive data, including program code, through network(s) via a network link and communication interface of I/O interface 702. In the Internet example, a server or cloud-based server system 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, system 700 may obtain application code in the form of a carrier wave.

Cloud-based server system 730 may include one or more backend apps 729. Such one or more backend apps 729 may be for providing services, such as SaaS and/or PaaS solutions, as described elsewhere herein.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
   a memory configured to store program code to provide a printing manager; and
   at least one processor core coupled to the memory, wherein the at least one processor core, in response to executing the program code, is configured to initiate operations for implementing the printing manager including:
   receiving a print job;
   pre-rendering the print job into a document image;
   storing the document image for a first caching thereof;
   receiving a push printing command; and
   downloading from a cache associated with the first caching the document image to a printer engine responsive to the push printing command; and
   wherein the document image and the push printing command respectively are a first document image and a first push printing command, the printing manager further comprising:
   receiving a second document image from the printer engine;
   storing the second document image in the cache for a second caching thereof; and
   downloading the second document image from the cache to the printer engine responsive to a second push printing command from a printer driver.

2. The apparatus according to claim 1, wherein the pre-rendering comprises raster image processing the print job with an image processor.

3. The apparatus according to claim 1, wherein the storing of the first document image is in a database.

4. The apparatus according to claim 1, wherein the storing of the first document image is in a file system with an index accessible with pointers.

5. The apparatus according to claim 4, wherein the index accessible with the pointers respectively is a hash-table with hashes for look-ups.

6. The apparatus according to claim 5, wherein the hashes include at least an identifier of the print job.

7. The apparatus according to claim 1, wherein the second caching comprises storing the second document image in either a file system or a database responsive to frequency of access of the second document image.

8. The apparatus according to claim 1, wherein the at least one processor core is in a standalone cloud or virtual server.

9. The apparatus according to claim 1, wherein the at least one processor core is hosted in a host computer device.

10. An apparatus, comprising:
a memory configured to store program code to provide a printer engine of a printing device; and
at least one processor core coupled to the memory, wherein the at least one processor core, in response to executing the program code, is configured to initiate operations for implementing use of the printer engine including:
receiving a print job marked with a pre-rendering flag;
pre-rendering the print job into a document image with the printer engine responsive to a job parameter included with the print job;
sending the document image to a printing manager for storage thereof in cache for subsequent push printing;
receiving a push command for the document image; and
downloading the document image from the printing manager to the printer engine responsive to the push command.

11. The apparatus according to claim 10, wherein the operations for the implementing use of the printer engine further include directly relaying the document image to a video layer for a page description language level for development and rendering onto a print medium.

12. The apparatus according to claim 11, wherein the printer engine is in firmware of the printing device.

13. The apparatus according to claim 12, wherein the printer engine is configured to interface with an image processor of the printing device.

14. The apparatus according to claim 13, wherein the printing device is a multi-function printer.

15. The apparatus according to claim 10, wherein the operations for the implementing use of the printer engine further include:
receiving another print job, wherein the other print job is for the push printing of the document image;
downloading the document image from the printing manager to the printer engine responsive to the other print job; and
directly relaying the document image to a video layer for a page description language level for development and rendering onto a print medium.

16. The apparatus according to claim 15, wherein the printer engine is in firmware of the printing device.

17. The apparatus according to claim 16, wherein the printer engine is configured to interface with an image processor of the printing device.

18. The apparatus according to claim 17, wherein the printing device is a multi-function printer.

19. The apparatus according to claim 15, wherein the other print job does not contain any page description language data to designate the other print job as a signal print job for the push printing thereof.

* * * * *